(12) United States Patent
Fujiune et al.

(10) Patent No.: US 7,307,933 B2
(45) Date of Patent: Dec. 11, 2007

(54) OPTICAL DISC DRIVE

(75) Inventors: Kenji Fujiune, Takatsuki (JP); Katsuya Watanabe, Nara (JP); Shin-ichi Yamada, Katano (JP); Yuuichi Kuze, Settsu (JP); Kenji Kondo, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 553 days.

(21) Appl. No.: 10/499,226

(22) PCT Filed: Jan. 20, 2003

(86) PCT No.: PCT/JP03/00447

§ 371 (c)(1),
(2), (4) Date: Jun. 17, 2004

(87) PCT Pub. No.: WO03/063150

PCT Pub. Date: Jul. 31, 2003

(65) Prior Publication Data

US 2005/0083798 A1    Apr. 21, 2005

(30) Foreign Application Priority Data

Jan. 23, 2002    (JP) .............................. 2002-013871

(51) Int. Cl.
  *G11B 7/125*    (2006.01)
  *G11B 7/09*    (2006.01)
(52) U.S. Cl. ............................. 369/53.28; 369/44.26; 369/44.23; 369/94
(58) Field of Classification Search .......... 369/112.01, 369/112.02, 112.29, 44.23, 94, 53.28, 53.22, 369/44.26, 47.53, 44.25, 44.29

See application file for complete search history.

(56) References Cited

U.S. PATENT DOCUMENTS 5,202,875 A * 4/1993 Rosen et al. .................. 369/94
5,757,742 A * 5/1998 Akiba et al. ............. 369/44.23
6,002,661 A * 12/1999 Abe et al. .............. 369/112.01

(Continued)

FOREIGN PATENT DOCUMENTS

JP    52-080802    7/1977
JP    11-176073 A    7/1999

(Continued)

*Primary Examiner*—Andrea Wellington
*Assistant Examiner*—Kim-Kwok Chu
(74) *Attorney, Agent, or Firm*—Akin Gump Strauss Hauer & Feld LLP

(57) ABSTRACT

An optical disc drive according to the present invention reads and/or writes data from/on an optical disc having at least one information layer with a light beam and includes: a spherical aberration detecting section for generating a spherical aberration signal representing a spherical aberration produced at a focal point of the light beam on the information layer of the disc; a spherical aberration changing section for changing the spherical aberration; a spherical aberration regulating section for generating an aberration correction signal to correct the spherical aberration by driving the changing section; and means for detecting a value of the aberration correction signal that minimizes the spherical aberration when the focal point of the light beam is located on the information layer of the disc and for detecting the depth of the information layer, which corresponds to a distance from the information layer on which the focal point of the light beam is located to the surface of the disc, based on the value.

12 Claims, 16 Drawing Sheets

U.S. PATENT DOCUMENTS

| | | |
|---|---|---|
| 6,285,635 B1 | 9/2001 | Watanabe et al. |
| 6,934,226 B2 * | 8/2005 | Yasuda et al. ........... 369/44.23 |
| 2001/0028614 A1 | 10/2001 | Furukawa |
| 2002/0018406 A1 | 2/2002 | Yamada |

FOREIGN PATENT DOCUMENTS

| | | |
|---|---|---|
| JP | 2000-090440 A | 3/2000 |
| JP | 2001-222838 A | 8/2001 |
| JP | 2001-351254 A | 12/2001 |

* cited by examiner (a)

FELVL (b)

(c)

OPTICAL DISC DRIVE

CROSS-REFERENCE TO RELATED APPLICATION

This application is a Section 371 of International Application No. PCT/JP03/00447, filed Jan. 20, 2003, the disclosure of which is incorporated herein by reference.

TECHNICAL FIELD

The present invention relates to an optical disc drive for reading and/or writing data from/on a disklike information storage medium (which will be referred to herein as an "optical disc") rotating. More particularly, the present invention relates to an optical disc drive that can recognize multiple types of optical discs when started up.

BACKGROUND ART

Data can be read out from a rotating optical disc by irradiating the optical disc with relatively weak light beam having a constant quantity and detecting the light that has been modulated by, and reflected from, the optical disc. On the other hand, in writing data on a recordable or rewritable optical disc, data is written there by irradiating the optical disc with a light beam, of which the quantity has been changed according to the data to be written, and locally changing the property of a storage material film. Such optical disc read and write operations are described in Japanese Laid-Open Publication No. 52-80802, for example.

On a read-only optical disc, information is already stored as pits that are arranged spirally during the manufacturing process of the optical disc. On the other hand, on a readable and rewritable optical disc, a storage material film, from/on which data can be read and written optically, is deposited by an evaporation process, for example, on the surface of a substrate on which tracks, including spiral concave or convex portions, are arranged.

It should be noted that the depth or height of the pits, the depth of the concave portions of the tracks or the height of the convex portions of the tracks, and the thickness of the storage material film are all far smaller than the thickness of the optical disc substrate. For that reason, those portions of the optical disc, where data is stored, define a substantially two-dimensional plane, which will be referred to herein as a "storage layer". Any optical disc includes at least one such storage layer.

To read or write data from/on a readable and rewritable optical disc, the light beam always needs to maintain a predetermined converging state on a storage layer. For that purpose, a "focus control" and a "tracking control" are required. The "focus control" means controlling the focal point of a light beam perpendicularly to the surface of a given optical disc (which direction will be referred to herein as a "focusing direction"). On the other hand, the "tracking control" means controlling the focal point of a light beam along the radius of a given optical disc (which direction will be referred to herein as a "tracking direction") such that the light beam spot is always located right on a target track.

Next, a conventional optical disc drive will be described with reference to FIG. 1. The optical disc drive shown in FIG. 1 is an apparatus that can read and/or write data from/on a loaded optical disc 1 and includes a mechanism for rotating the optical disc 1 with a motor (not shown), an optical head 10 for irradiating the rotating optical disc 1 with light, and a signal processing and control section, which exchanges electrical signals with the optical head 10.

The optical head 10 includes a laser light source 11, a condenser lens 13, a polarization beam splitter 12, a focus actuator (which will be referred to herein as an "Fc actuator") 14, a tracking actuator (which will be referred to herein as an "Tk actuator") 15, and a photodetector 16.

A light beam, which has been emitted from the laser light source 11, is transmitted through the polarization beam splitter 12 and then focused onto the disklike optical disc 1 by the condenser lens 13. After having been reflected from the optical disc 1, the light beam is passed through the condenser lens 13 again, reflected from the polarization beam splitter 12 and then incident onto the photodetector 16.

When current is allowed to flow through the Fc actuator 14, the condenser lens 13, supported by an elastic body (not shown), moves in the focusing direction due to an electromagnetic force. On the other hand, when current is allowed to flow through the Tk actuator 15, the condenser lens 13 moves in the tracking direction.

The photodetector 16 outputs a light quantity signal to a focus error generator (which will be referred to herein as an "FE generator") 30, a tracking error generator (which will be referred to herein as a "TE generator") 40, a reflected light quantity detector 66, a wobble detector 83, and a disc type information reader 84.

The FE generator 30 functions as a focus error signal detecting section and generates an error signal representing the focusing state of the light beam with respect to the information layer of the optical disc 1 based on the light quantity signal supplied from the photodetector 16. The error signal is obtained, through computations, as a signal representing the deviation of the focal point of the light beam from the information layer of the optical disc 1 (which will be referred to herein as an "FE signal"). The FE signal is transferred to the Fc actuator 14 by way of a focus control filter (which will be referred to herein as an "Fc filter") 31 and a focus control driver (which will be referred to herein as an "Fc driver") 32, which function as a focus control driving section. The Fc filter 31 and Fc driver 32 perform phase compensation to get the focus control done with good stability.

In accordance with the FE signal supplied from the Fc driver 32, the Fc actuator 14 drives the condenser lens 13 in the focus direction such that the light beam is focused in a predetermined state on a certain information layer of the optical disc 1, which is so-called "focus control".

The TE generator 40 functions as a tracking error detecting section and generates an error signal representing a positional relationship between the light beam spot on the optical disc 1 and the track (which will be referred to herein as a "TE signal") based on the light quantity signal supplied from the photodetector 16. The TE signal is transferred to the Tk actuator 15 by way of a tracking control filter (which will be referred to herein as an "Tk filter") 41 and a tracking control driver (which will be referred to herein as an "Tk driver") 42. In accordance with the TE signal supplied from the Tk driver 42, the Tk actuator 15 drives the condenser lens 13 in the tracking direction such that the light beam spot follows the tracks, which is so-called "tracking control".

In accordance with the signal supplied from the photodetector 16, the reflected light quantity detector 66 detects the quantity of the light that has been reflected from the optical disc 1 and outputs the reflected light quantity value detected to a disc type recognizer 85. In response to the signal supplied from the photodetector 16, the wobble detector 83 detects the amplitude of micro wobbling (which will be referred to herein as "wobble") of the tracks on the optical disc 1 and outputs the amplitude value detected to the disc type recognizer 85. On receiving the signal from the photodetector 16, the disc type information reader 84 reads the optical disc information, which was written in advance on the optical disc 1, and transmits the optical disc information to the disc type recognizer 85.

Based on the signals supplied from the reflected light quantity detector 66, wobble detector 83 and disc type information reader 84, the disc type recognizer 85 recognizes the type of the given optical disc 1.

Suppose the reflectance of the optical disc changes with the type of the disc. In that case, even if the given optical disc 1 is irradiated with a light beam having the same intensity, the quantity of light reflected changes according to the reflectance of that optical disc 1. Accordingly, by comparing the quantity of the light reflected from the optical disc 1 with a predetermined level, the type of the given optical disc 1 can be recognized by the specific level of the reflectance of the optical disc.

Also, some types of optical discs may have the wobble but others not. Accordingly, if it is determined, by detecting the wobble amplitude of the given optical disc 1, whether or not the wobble is present on that optical disc 1, the type of the given optical disc 1 can be recognized.

Furthermore, information about a disc type may be stored on some optical discs. Thus, the type of the given optical disc 1 may be recognized by reading the optical disc information.

Hereinafter, another conventional optical disc drive will be described with reference to FIG. 2. In FIG. 2, any component, having the same function as the counterpart shown in FIG. 1, is identified by the same reference numeral as that used in FIG. 1 and the description thereof will be omitted herein.

The apparatus shown in FIG. 2 includes a disc type recognizer 67 functioning as disc type recognizing means. The disc type recognizer 67 recognizes the type of a given optical disc in accordance with a signal supplied from a reflected light quantity detector 66 and outputs a signal, representing the result of recognition, to a best optical wavelength selector 87.

The disc type recognizer 67 sends a low-level signal to an optical wavelength selector 90 while still recognizing the type of the optical disc, but sends a high-level signal to the optical wavelength selector 90 after having recognized the type of the optical disc.

A best optical wavelength table 86 stores information about the best optical wavelengths for multiple types of optical discs, from/on which this optical disc drive can read and/or write data. Also, the best optical wavelength table 86 provides the optical wavelength information for a best optical wavelength selector 87 and an initial optical wavelength selector 88.

The best optical wavelength selector 87 selects one of the best optical wavelengths in accordance with the recognition result of the disc type recognizer 67 and the optical wavelength information stored in the best optical wavelength table 86, and then outputs a signal, representing the optical wavelength selected, to the optical wavelength selector 90.

A selection index generator 89 supplies an index signal to the initial optical wavelength selector 88 so as to instruct the initial optical wavelength selector 88 to select the longest wavelength. In response to the index signal supplied from the selection index generator 89, the initial optical wavelength selector 88 selects the longest optical wavelength in accordance with the optical wavelength information stored in the best optical wavelength table 86 and supplies a signal, representing the wavelength selected, to the optical wavelength selector 90.

If the signal supplied from the disc type recognizer 67 is low, the optical wavelength selector 90 selects the optical wavelength, provided by the initial optical wavelength selector 88, for the laser light source 11. On the other hand, if the signal supplied from the disc type recognizer 67 is high, the optical wavelength selector 90 selects the optical wavelength, provided by the best optical wavelength selector 87, for the laser light source 11. In response, the laser light source 11, including multiple types of semiconductor laser diodes, for example, radiates a light beam having the specified optical wavelength.

Suppose an optical disc, from/on which data should be read or written at a long optical wavelength, has been loaded into an optical disc drive. In that case, if the optical disc is irradiated with a light beam having a short optical wavelength during a startup process, then the data may be lost from the optical disc, which is a problem. The lost data has a length corresponding to approximately one-fourth to one-half rotation of the optical disc. Accordingly, even if error correction were made, the lost data could not be correctible and could not be read at all. Among other things, a storage material film, which is optimized to a long optical wavelength, causes such a problem particularly easily because such a film absorbs a lot of light with short wavelengths. To overcome such a problem, a technique of using a long wavelength before the type of the given optical disc is recognized was proposed. A conventional optical disc drive of that type is disclosed in Japanese Laid-Open Publication No. 11-176073, for example.

Hereinafter, still another optical disc drive will be described with reference to FIG. 3. In FIG. 3, any component, having the same function as the counterpart shown in FIG. 1, is identified by the same reference numeral as that used in FIG. 1 and the description thereof will be omitted herein.

The apparatus shown in FIG. 3 includes a focusing instructor 77 and a control switch 78, which together functions as focusing means, and a search drive generator 79 functioning as search driving means.

The output of an FE generator 30 is supplied to an Fc filter 31 and the focusing instructor 77. The output signal of the Fc filter 31 is supplied to the control switch 83. In the initial state, the focusing instructor 77 sends a low-level signal to the control switch 78. However, after the FE signal supplied from the FE generator 30 has exceeded a predetermined level and decreased to less than a zero-cross point, the focusing instructor 77 sends a high-level signal to the control switch 78. The search drive generator 79 supplies a drive signal, which will move the condenser lens 13 toward the optical disc 1, to the control switch 78.

If the signal supplied from the focusing instructor 77 is low, then the control switch 78 passes the output signal of the search drive generator 79 to the Fc driver 32. On the other hand, if the signal supplied from the focusing instructor 77 is high, then the control switch 78 passes the output signal of the Fc filter 31 to the Fc driver 32.

Next, it will be described with reference to FIG. 4 how the optical disc drive shown in FIG. 3 performs a focusing operation. Portion (a) of FIG. 4 shows the output FE signal of the FE generator 30, portion (b) of FIG. 4 shows the output signal of the focusing instructor 77, and portion (c) of FIG. 4 shows the sources of drive signals to be selected by the control switch 78. In portions (a) through (a) of FIG. 4, the abscissa represents the time.

Once a startup operation is started with an optical disc loaded into the optical disc drive, the control switch 78 selects the drive signal supplied from the search drive generator 79 in the initial state. Then, the focal point of the light beam that has been converged by the condenser lens 13 is shifted toward the information layer of the optical disc 1. When the FE signal supplied from the FE generator 30 crosses zero after having exceeded a predetermined level FELVL, the output signal of the focusing instructor 77 changes from the low level into the high level. As of that moment, the control switch 78 selects the drive signal supplied from the Fc filter 31, thus turning the focus control ON.

In a multilayer storage optical disc with a plurality of information layers on which information can be stored, the light beam needs to be distributed uniformly to the respective information layers. For that reason, the greater the number of information layers, the higher the transmittance, but the lower the reflectance and absorbance, of each information layer should be.

Also, in a rewritable optical disc, written and unwritten areas of each information layer have mutually different reflectances. Accordingly, the quantity of reflected light detected changes depending on whether the spot of the light beam that has been radiated to recognize the type of the optical disc is located in an unwritten area or in a written area. Thus, the quantity of light reflected changes not only with the number of information layers the given optical disc has but also with the specific beam spot location on each information layer. For that reason, it is difficult to distinguish, just by the quantity of reflected light, several types of multilayer storage optical discs with different numbers of information layers from each other.

Furthermore, no matter how many information layers a multilayer storage optical disc has, each and every information layer thereof has track wobbles. Thus, it is difficult to distinguish, just by the wobble amplitude, several types of multilayer storage optical discs with different numbers of information layers from each other.

As described above, in a multilayer storage optical disc, as the number of information layers increases, the transmittance of each storage layer needs to be increased, and therefore, the reflectance and absorbance of each information layer both decrease. To compensate for such a decrease, as the number of information layers increases, the intensity of the light beam radiated from a laser light source needs to be increased. For that reason, if the type of the given optical disc 1 is recognized by reading optical disc information from the optical disc, then the intensity of the light beam radiated from the laser light source needs to be changed after the type recognition. However, if the intensity of the light beam is changed, then it takes a longer startup time because a learning operation for reading the optical disc information must be carried out again.

Furthermore, in a multilayer storage optical disc, the best light intensity of the light beam radiated from the laser light source changes with the number of information layers as described above. If a rewritable optical disc is exposed to a light beam with an excessively high intensity, then the information stored there may be altered. Also, if an optical disc is irradiated with a light beam, of which the intensity is higher than the best light intensity, before the type of the optical disc is recognized, then the information stored there will be lost to a non-correctible degree.

Meanwhile, to further increase the storage density of optical discs, the distance from the surface of an optical disc to an information layer thereof (which will be referred to herein as an "information layer depth") tends to decrease. In a multilayer storage optical disc that has had its density increased in this manner, it is difficult to narrow the gap between the information layers so as to prevent the information layers from affecting each other. Thus, the variation in depth between the information layers increases. If the information layer depth changes at a greater percentage, then the spherical aberration produced on each information layer also changes more significantly. Hereinafter, this problem will be described with reference to FIG. 5.

FIG. 5 shows cross sections of two types of optical discs with mutually different information layer depths. Specifically, the optical disc shown on the left-hand side of FIG. 5 has a relatively deep information layer, while the optical disc shown on the right-hand side of FIG. 5 has a relatively shallow information layer. On each of these optical discs, a focus control is carried out such that the focal point of the light beam is located right on its information layer.

Suppose the light beam that has been converged by the condenser lens 13 produces the smallest spherical aberration with respect to the optical disc shown on the left-hand side of FIG. 5. In that case, the light beam is focused at a point on the information layer in the optical disc shown on the left-hand side of FIG. 5. However, if the information layer depth is different as in the optical disc shown on the right-hand side of FIG. 5, then the light beam is not focused at a point but a gap is created between the focal point of the light beam passing the inside portion of the condenser lens 13 and that of the light beam passing the outside portion of condenser lens 13, which is so-called "spherical aberration". When such a spherical aberration is produced, the data that has been read from, or written on, the information layer has deteriorated quality. Thus, the spherical aberration needs to be adjusted with respect to the information layer on which the focal point of the light beam should be located.

In an apparatus of recognizing the type of a given optical disc based on the optical disc information that has been stored on the optical disc, the time it takes to finish the type recognition increases by the time to adjust the spherical aberration, thus extending the startup time of the optical disc drive unintentionally.

As described above, the magnitude of spherical aberration changes with the depth of the information layer. In addition, if the spherical aberration increases, the FE signal deteriorates and focusing becomes harder to accomplish.

In order to overcome the problems described above, an object of the present invention is to provide an optical disc drive, which can quickly perform a start-up process on a rewritable multilayer optical disc.

DISCLOSURE OF INVENTION

An optical disc drive according to the present invention reads and/or writes data from/on an optical disc, having at least one information layer, by using a light beam. The optical disc drive includes: a spherical aberration detecting section for generating a spherical aberration signal representing a spherical aberration that has been produced at a focal point of the light beam on the information layer of the optical disc; a spherical aberration changing section for changing the spherical aberration; a spherical aberration regulating section for generating an aberration correction signal to correct the spherical aberration by driving the spherical aberration changing section; and means for detecting a value of the aberration correction signal that minimizes the spherical aberration in a situation where the focal point of the light beam is located on the information layer of the optical disc and for detecting the depth of the information layer, which corresponds to a distance from the information layer on which the focal point of the light beam is located to the surface of the optical disc, based on the value.

In one preferred embodiment, the optical disc drive further includes comparing means for comparing the value of the aberration correction signal, which minimizes the spherical aberration in the situation where the focal point of the light beam is located on the information layer of the optical disc, with a predetermined value.

In another preferred embodiment, if the optical disc, irradiated with the light beam, has a plurality of information layers, the optical disc drive determines, based on a comparison result obtained by the comparing means, on which of the information layers the focal point of the light beam is currently located.

In another preferred embodiment, the optical disc drive recognizes, based on a comparison result obtained by the comparing means, the type of the optical disc being irradiated with the light beam.

In another preferred embodiment, the optical disc drive detects, based on a comparison result obtained by the comparing means, the number of the information layers that the optical disc being irradiated with the light beam has.

In another preferred embodiment, the optical disc drive detects a quantity, corresponding to a distance from the surface of the optical disc to one of the information layers that is closest to the surface of the optical disc, thereby recognizing the optical disc being irradiated with the light beam based on the quantity detected.

In another preferred embodiment, if the optical disc, irradiated with the light beam, has a plurality of information layers, the optical disc drive determines, based on a comparison result obtained by the comparing means and address information acquired from the information layer on which the focal point of the light beam is located, on which of the information layers the focal point of the light beam is currently located.

In another preferred embodiment, the optical disc drive further includes: converged beam irradiating means for converging the light beam and irradiating the optical disc with the converged light beam; a focus regulating section for shifting the focal point of the light beam, which has been converged by the converged beam irradiating means, perpendicularly to the information layers of the optical disc; a focus error signal detecting section for generating a signal representing the deviation of the focal point of the light beam from each said information layer of the optical disc; and a focus control driving section for driving the focus regulating section in response to a signal supplied from the focus error signal detecting section such that the focal point of the light beam catches up with the information layer of the optical disc.

In another preferred embodiment, the optical disc drive further includes: a tracking error detecting section for detecting a signal representing a positional relationship between the focal point of the light beam and a track on the optical disc; and an amplitude detecting section for detecting the amplitude of a signal supplied from the tracking error detecting section. The spherical aberration regulating section drives the spherical aberration changing section so as to maximize a signal supplied from the amplitude detecting section.

In another preferred embodiment, the spherical aberration regulating section drives the spherical aberration changing section so as to make the signal supplied from the spherical aberration detecting section equal to zero.

In another preferred embodiment, the optical disc drive further includes a judging section for judging the validity of the spherical aberration signal supplied from the spherical aberration detecting section. The spherical aberration regulating section drives the spherical aberration changing section such that the judging section recognizes the validity of the spherical aberration signal and then drives the spherical aberration changing section such that the spherical aberration signal supplied from the spherical aberration detecting section becomes zero.

In another preferred embodiment, the optical disc drive further includes judging means for judging the validity of the spherical aberration signal supplied from the spherical aberration detecting section. The spherical aberration regulating section drives the spherical aberration changing section such that the judging means recognizes the validity of the spherical aberration signal.

Still another optical disc drive according to the present invention includes: a converged beam irradiating section for converging a light beam and irradiating multiple types of optical discs, which use a light beam of the same wavelength to read information but have mutually different best light beam intensities, with the converged light beam; a disc type recognizing section for recognizing the type of a given optical disc; a best intensity storage section for storing the best light beam intensities of all type of optical discs to handle; and a light intensity setting section for setting a light beam intensity, which would not cause any alteration in the information stored on the information layer of any of the multiple types of optical discs to handle, for the converged beam irradiating section if the disc type recognizing section has not recognized the type of the given optical disc yet and also selecting one of the light beam intensities from the best intensity storage section according to a recognition result obtained by the disc type recognizing section that has already recognized the type of the given optical disc and setting the selected light beam intensity for the converged beam irradiating section.

In one preferred embodiment, the optical disc drive further includes an allowable intensity storage section for storing allowable light beam intensities, at or under which no alteration should occur in the information stored on any of the multiple types of optical discs to handle. If the disc type recognizing section has not recognized the type of the given optical disc yet, the light intensity setting section selects the weakest one of the light beam intensities from the allowable intensity storage section and setting the selected light beam intensity for the converged beam irradiating section.

In another preferred embodiment, if the disc type recognizing section has not recognized the type of the given optical disc yet, the light intensity setting section selects the weakest one of the light beam intensities from the best intensity storage section and setting the selected light beam intensity for the converged beam irradiating section.

In another preferred embodiment, if the disc type recognizing section has not recognized the type of the given optical disc yet, the light intensity setting section selects one of the best light beam intensities, which is associated with a type of optical disc with the smallest number of information layers, from the best intensity storage section and setting the selected light beam intensity for the converged beam irradiating section.

Yet another optical disc drive according to the present invention includes: a converged beam irradiating section for converging a light beam and irradiating multiple types of optical discs, all of which have an area, having a micro wobbled track representing information and storing no user information, at the same radial location, with the converged light beam; a transport section for shifting the focal point of the light beam, which has been converged by the converged beam irradiating section, along the radius of the optical disc; a disc type recognizing section for recognizing the type of the given optical disc; and a transport driving section for generating a drive signal for the transport section such that the area of the optical disc, from which the information stored as the micro track wobble is read, is irradiated with the light beam if the disc type recognizing section has not recognized the type of the given optical disc yet.

In one preferred embodiment, the optical disc drive further includes: a rotating section for rotating the optical disc; a focus shifting section for shifting the focal point of the light beam, which has been converged by the converged beam irradiating section, perpendicularly to the information layer of the optical disc; and a passage sensing section for sensing the focal point of the light beam passing through the information layer of the optical disc. While the rotating section has not started to rotate the optical disc yet, the disc type recognizing section supplies a monotonically increasing or decreasing drive signal to the focus shifting section and counts the number of information layers in response to a signal supplied from the passage sensing section.

Yet another optical disc drive according to the present invention includes: a converged beam irradiating section for converging a light beam and irradiating multiple types of optical discs, having respectively different numbers of information layers, with the converged light beam; a disc type recognizing section for recognizing a given optical disc as having an information layer at a particular depth; a focus shifting section for shifting the focal point of the light beam, which has been converged by the converged beam irradiating section, perpendicularly to the information layers of the optical disc; a focus error signal detecting section for generating a signal representing the deviation of the focal point of the light beam from each information layer of the optical disc; a focus control driving section for generating a drive signal for the focus shifting section such that the focal point of the light beam catches up with a target information layer of the optical disc in accordance with a signal supplied from the focus error signal detecting section; and an information layer selecting section for, if the disc type recognizing section has recognized the given optical disc as a type having an information layer at a particular substrate thickness position, selecting the information layer at the substrate thickness position as the information layer, toward which the focus control driving section controls the focal point of the light beam.

In another preferred embodiment, the disc type recognizing section recognizes the given optical disc as an optical disc in which one of at least one information layer, which is most distant from its surface, has a uniform substrate thickness. The information layer selecting section includes: a search driving section for generating a drive signal to instruct the focus shifting section to bring the focal point of the light beam away from a position close to the optical disc when the disc type recognizing section recognizes the given optical disc as an optical disc in which the information layer, most distant from its surface, has the uniform substrate thickness; and a focusing section for selectively supplying a signal either from the focus control driving section or the search driving section to the focus shifting section in response to the signal supplied from the focus error signal detecting section.

In another preferred embodiment, the disc type recognizing section recognizes the given optical disc as an optical disc in which one of at least one information layer, which is closest to its surface, has a uniform substrate thickness. The information layer selecting section includes: a search driving section for generating a drive signal to instruct the focus shifting section to bring the focal point of the light beam from a distant position toward the optical disc when the disc type recognizing section recognizes the given optical disc as an optical disc in which the information layer, closest to its surface, has the uniform substrate thickness; and a focusing section for selectively supplying a signal either from the focus control driving section or the search driving section to the focus shifting section in response to the signal supplied from the focus error signal detecting section.

Yet another optical disc drive according to the present invention includes: a converged beam irradiating section for converging a light beam and irradiating multiple types of optical discs, having respectively different numbers of information layers, with the converged light beam; a disc type recognizing section for recognizing the type of a given optical disc; a spherical aberration changing section for changing a spherical aberration to be produced at the focal point of the light beam that has been converged by the converged beam irradiating section; a substrate thickness storage section for storing the substrate thicknesses of all information layers of the optical discs; and a spherical aberration correction generating section for obtaining the substrate thicknesses of information layers, which could be present in the optical disc, from the substrate thickness storage section based on a recognition result obtained by the disc type recognizing section and supplying a drive signal, representing their average, to the spherical aberration changing section.

Yet another optical disc drive according to the present invention includes: a converged beam irradiating section for converging a light beam and irradiating multiple types of optical discs, having respectively different numbers of information layers, with the converged light beam; a disc type recognizing section for recognizing the type of a given optical disc; a spherical aberration changing section for changing a spherical aberration to be produced at the focal point of the light beam that has been converged by the converged beam irradiating section; a substrate thickness storage section for storing the substrate thicknesses of all information layers of the optical discs; and a spherical aberration correction generating section for obtaining the maximum and minimum substrate thicknesses of information layers, which could be present in the optical disc, from the substrate thickness storage section based on a recognition result obtained by the disc type recognizing section and supplying a drive signal, representing their average, to the spherical aberration changing section.

Figure 4:
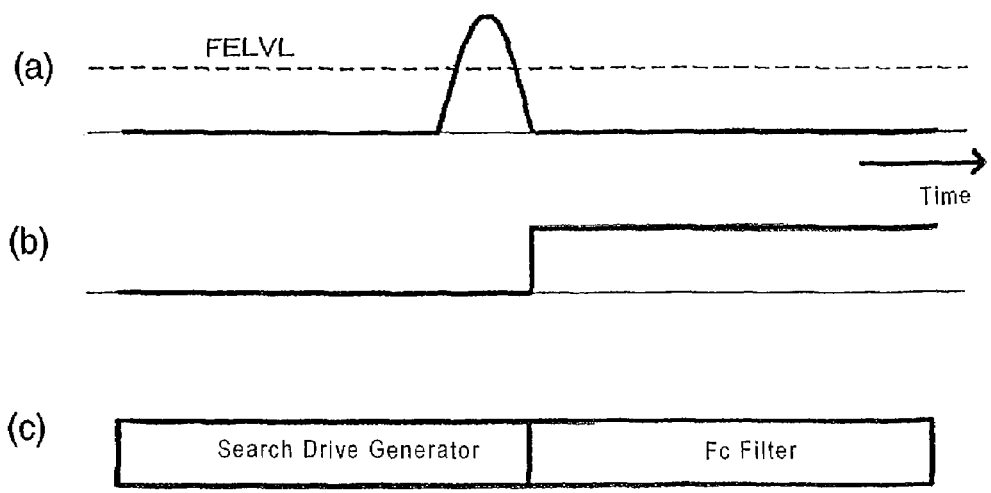

Portion (a) of FIG. 4 shows an output signal of an FE generator in the conventional optical disc drive, portion (b) of FIG. 4 shows an output signal of a focusing instructor in the conventional optical disc drive, and portion (c) of FIG. 4 shows the sources of drive signals to be selected by a control switch.

Figure 5:
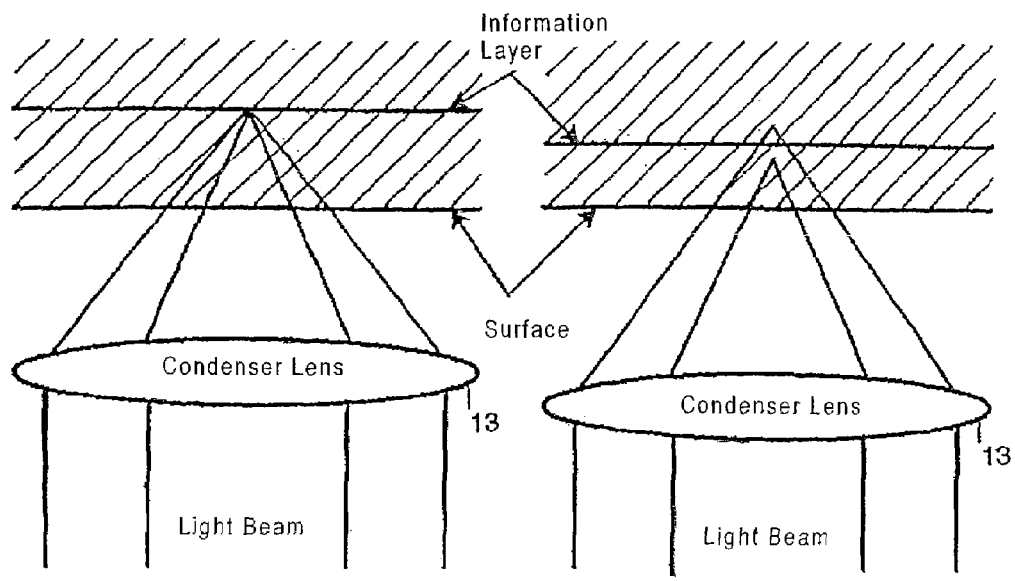

FIG. 5 is cross-sectional views showing how a spherical aberration is produced.

Figure 6:
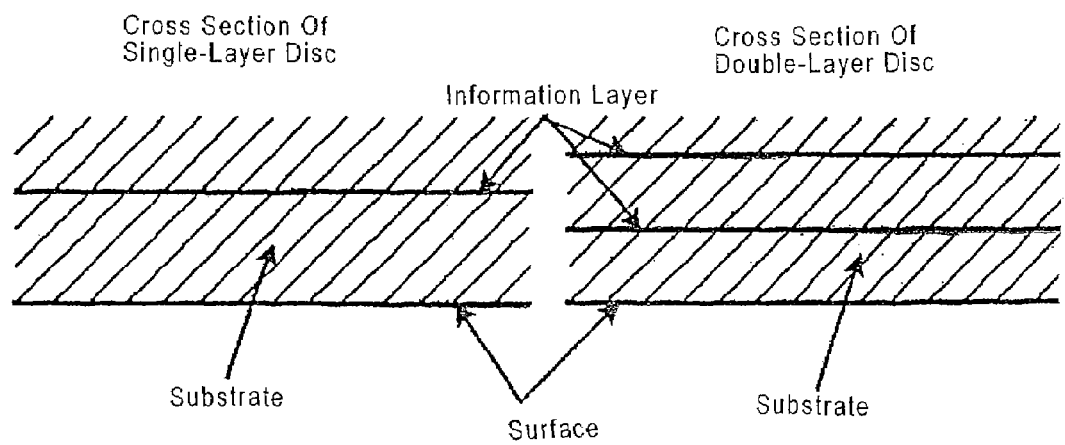

FIG. 6 is cross-sectional views showing two types of optical discs that can be loaded into an optical disc drive according to a first preferred embodiment of the present invention.

Figure 7:
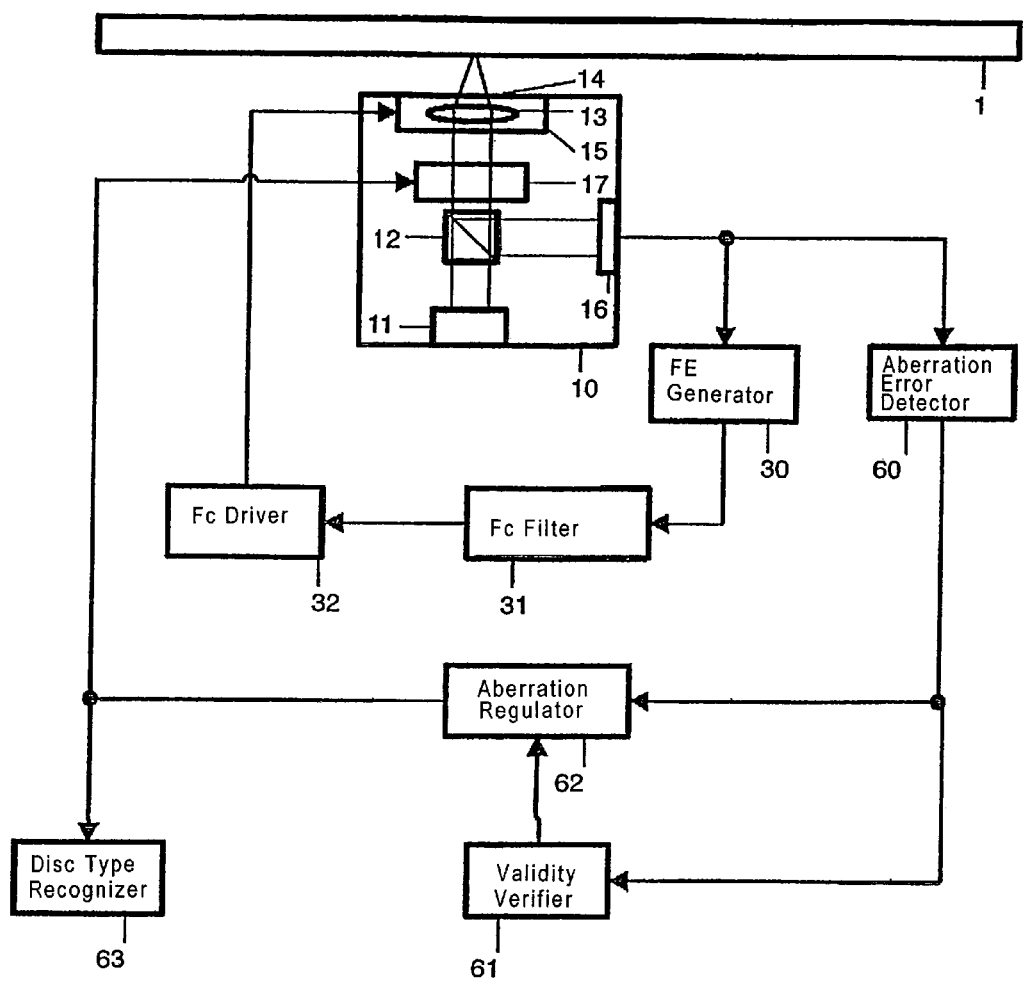

FIG. 7 is a block diagram showing an optical disc drive according to the first preferred embodiment of the present invention.

Figure 8:
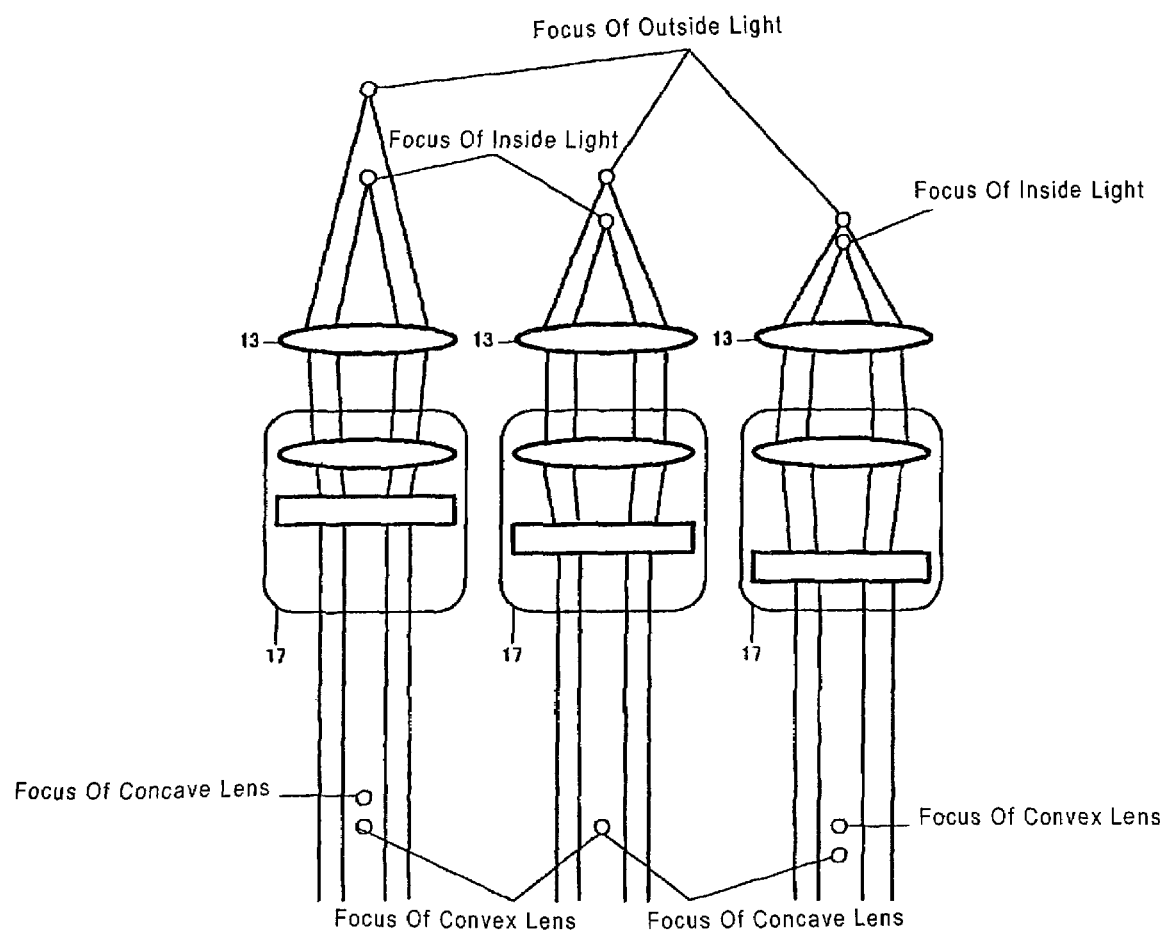

FIG. 8 illustrates an exemplary configuration for a spherical aberration producer, which can be used effectively in an optical disc drive according to the present invention.

Figure 9:
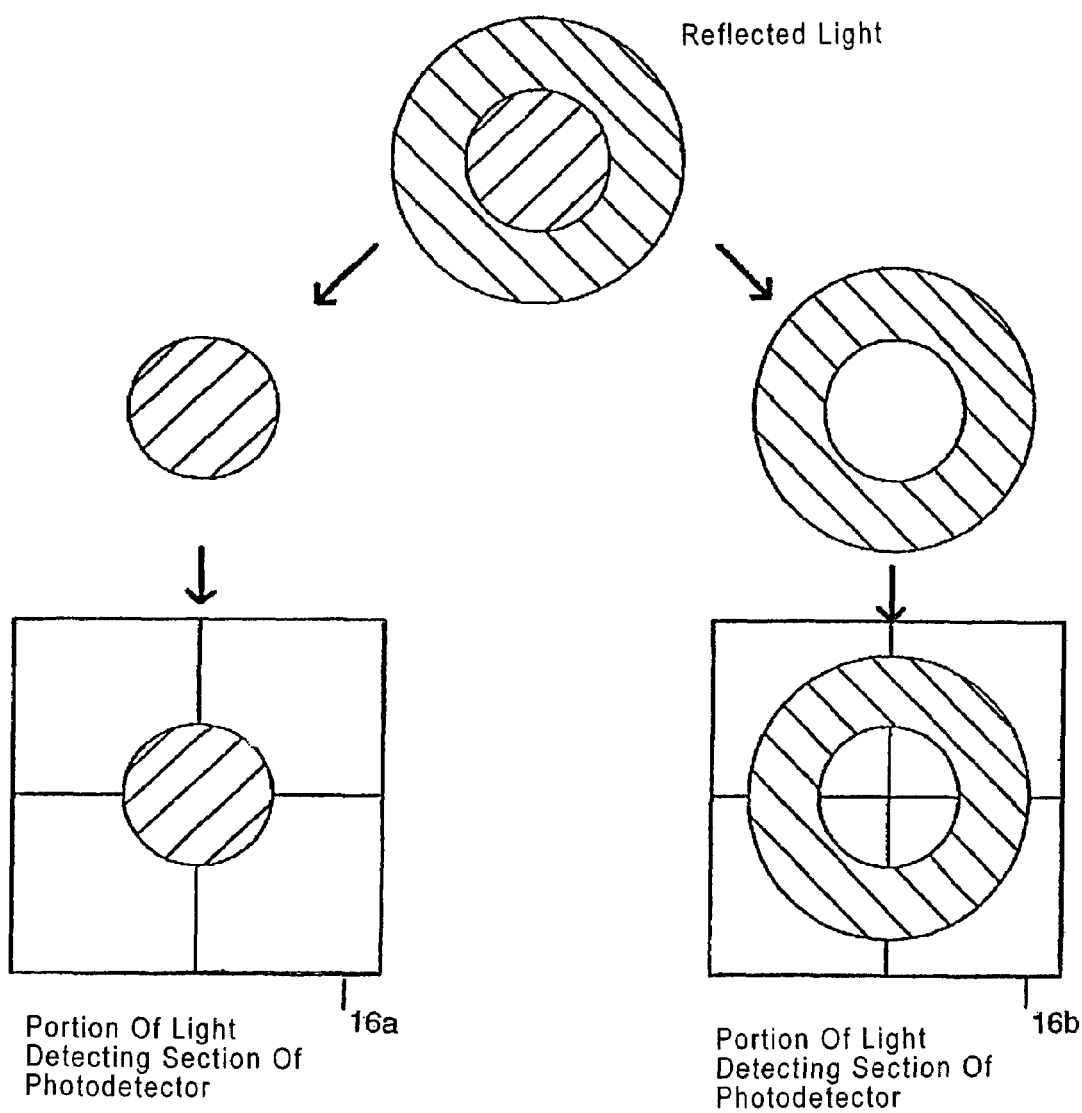

FIG. 9 shows how to detect a spherical aberration.

Figure 10:
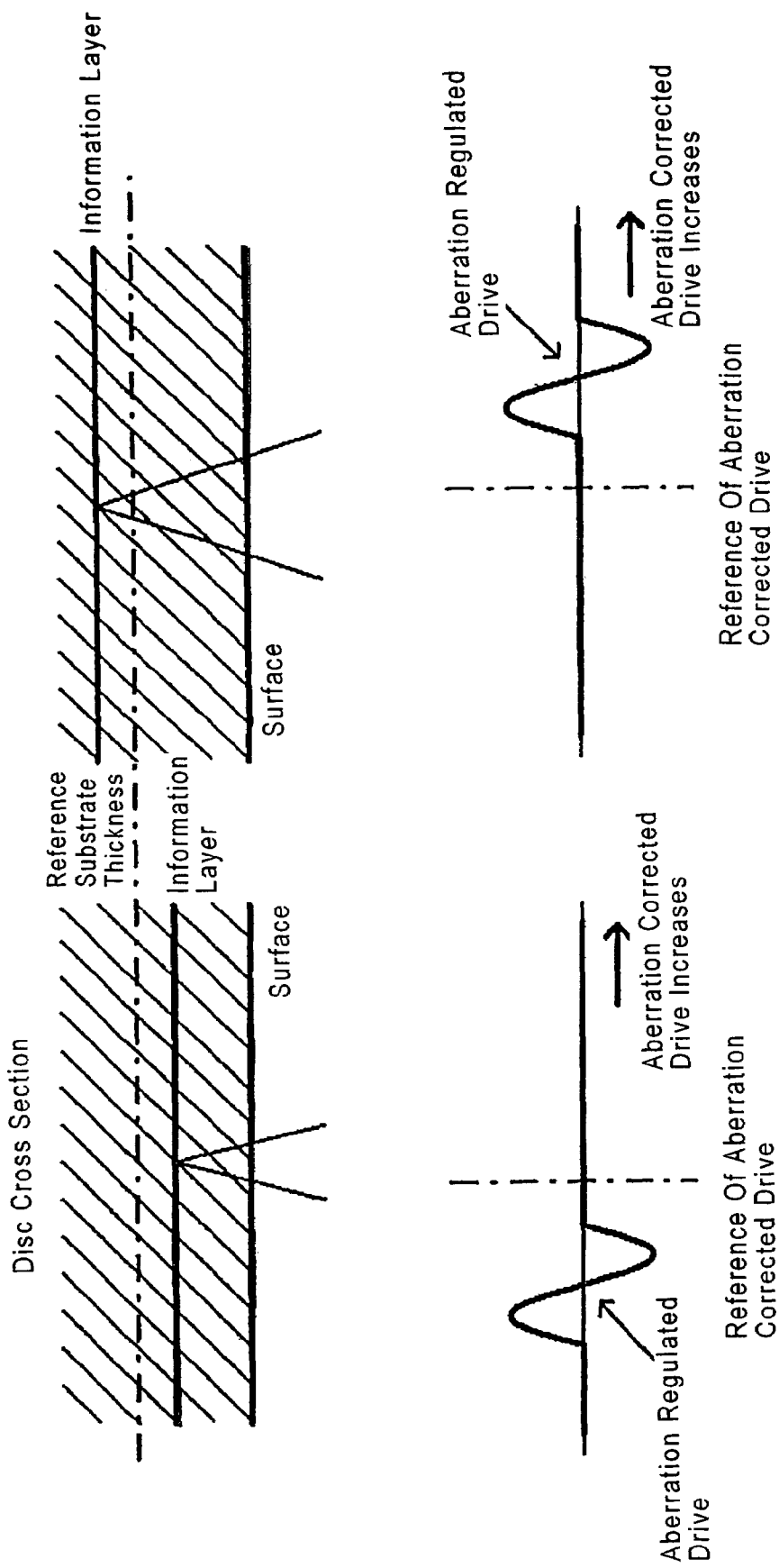

FIG. 10 shows waveforms of spherical aberration error signals.

Figure 11:
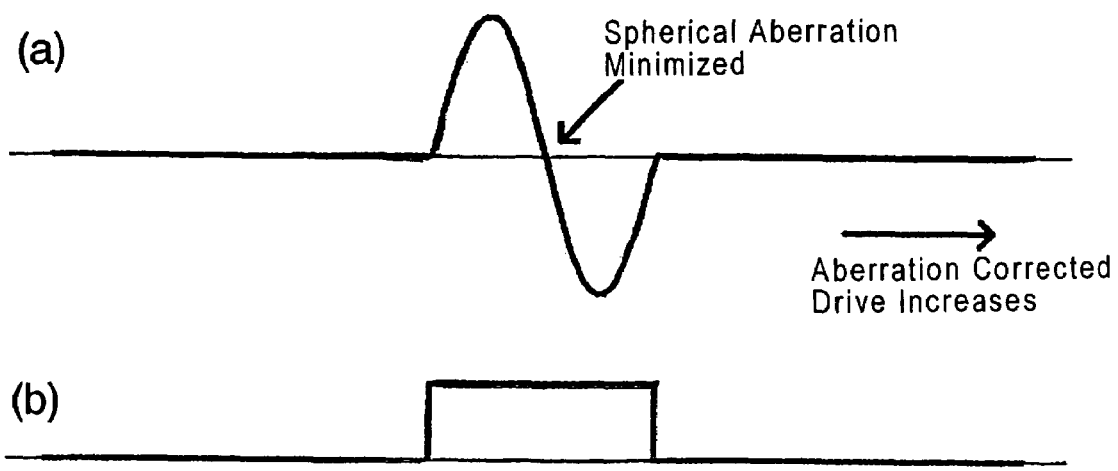

Portion (a) of FIG. 11 shows how an output signal of an aberration error detector changes with the magnitude of spherical aberration, and portion (b) of FIG. 11 shows how an output signal of a validity verifier changes with the magnitude of spherical aberration.

Figure 12:
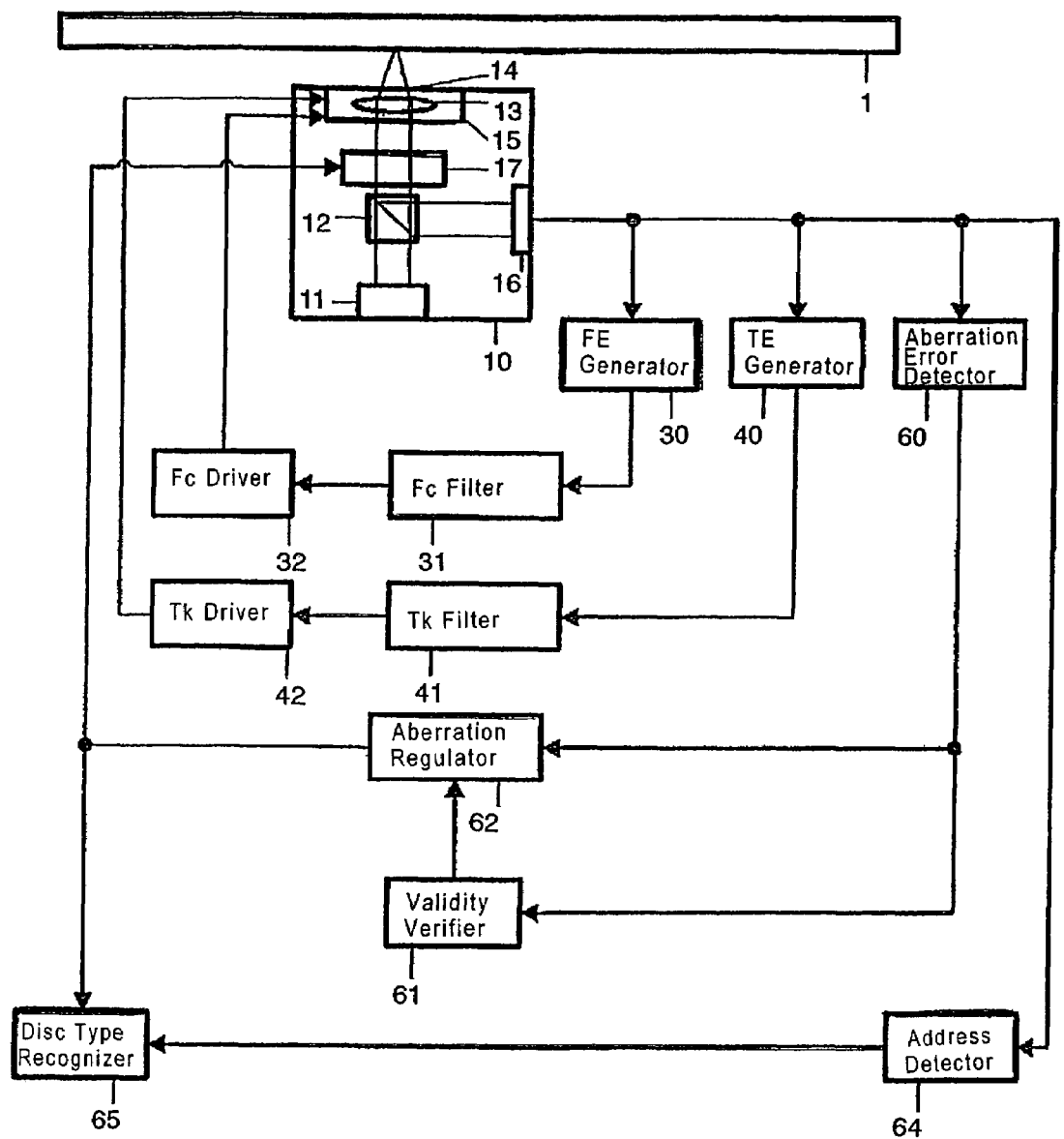

FIG. 12 is a block diagram showing an optical disc drive according to a second preferred embodiment of the present invention.

Figure 13:
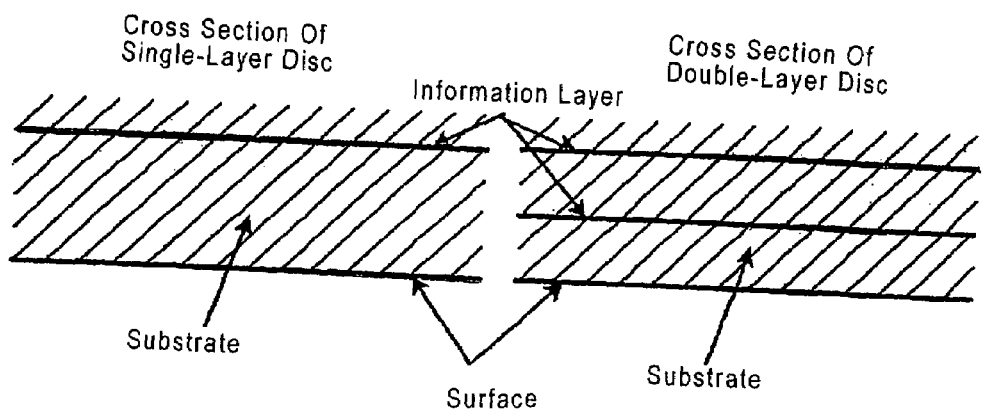

FIG. 13 is cross-sectional views showing optical discs, which may be used in an optical disc drive according to the second or fifth preferred embodiment of the present invention.

Figure 14:
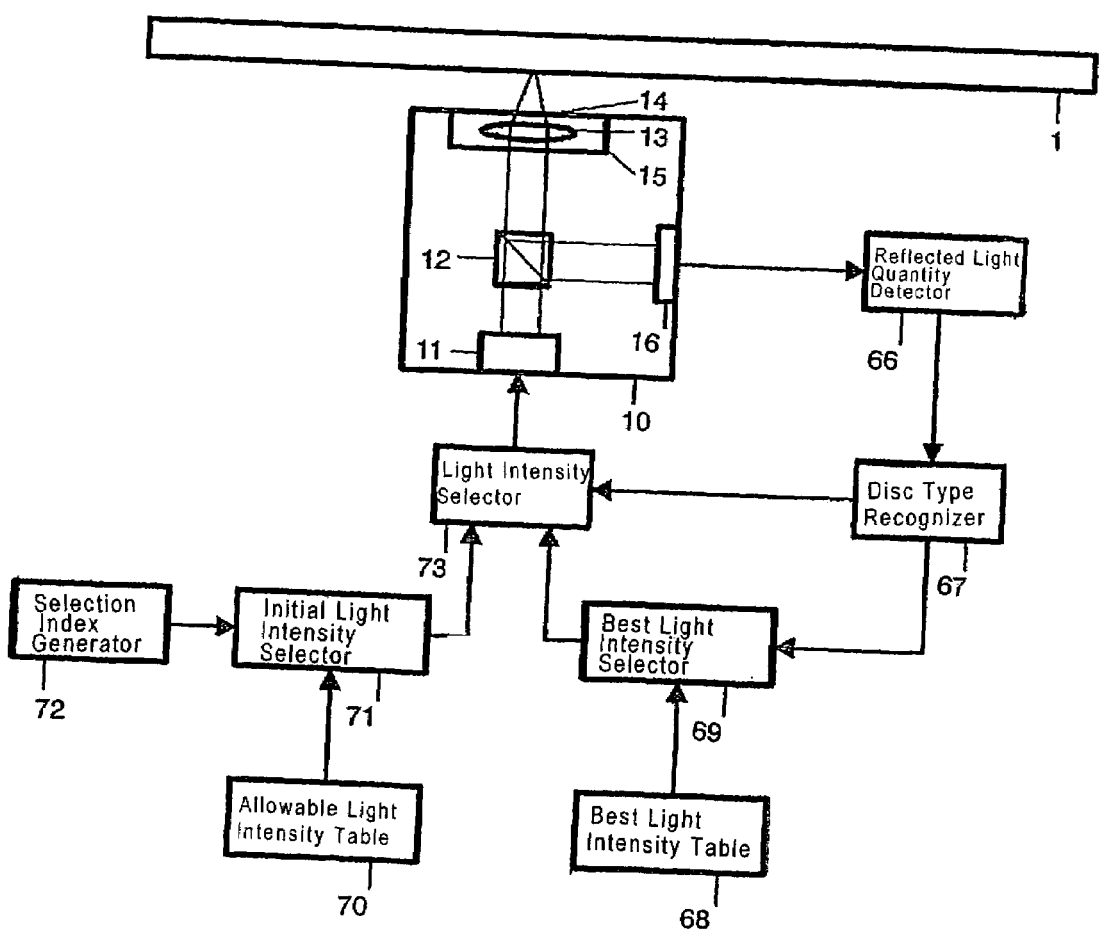

FIG. 14 is a block diagram showing an optical disc drive according to a third preferred embodiment of the present invention.

Figure 15:
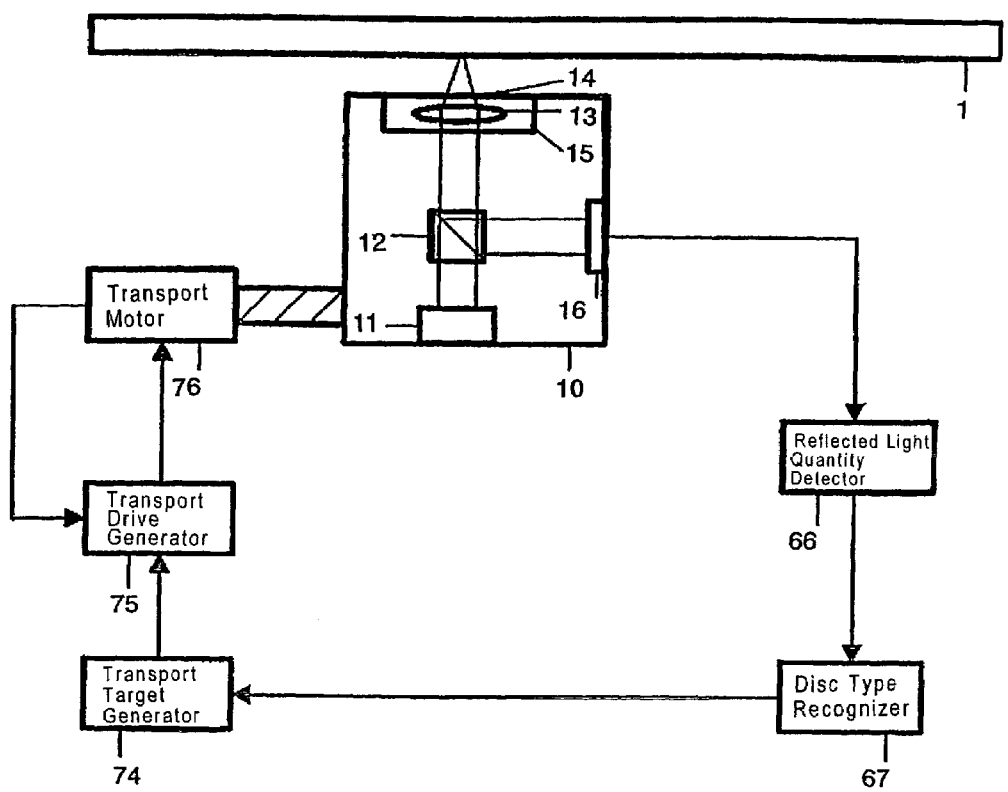

FIG. 15 is a block diagram showing an optical disc drive according to a fourth preferred embodiment of the present invention.

Figure 16:
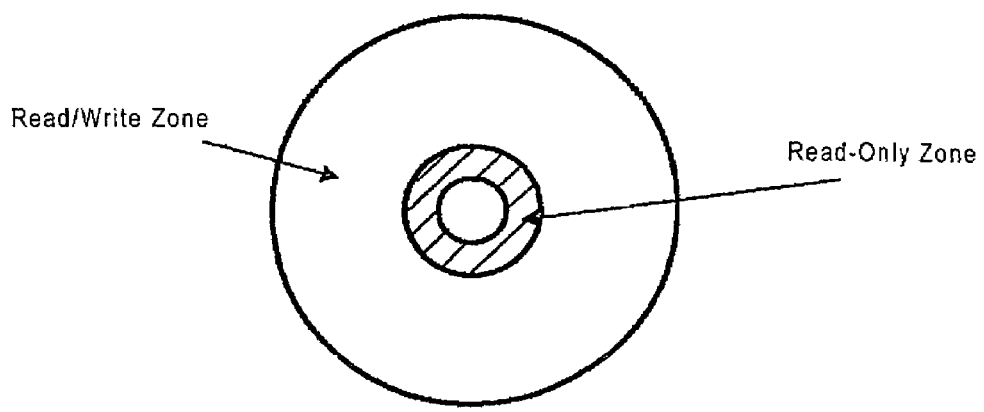

FIG. 16 is a plan view illustrating an optical disc, which may be used in the fourth preferred embodiment.

Figure 17:
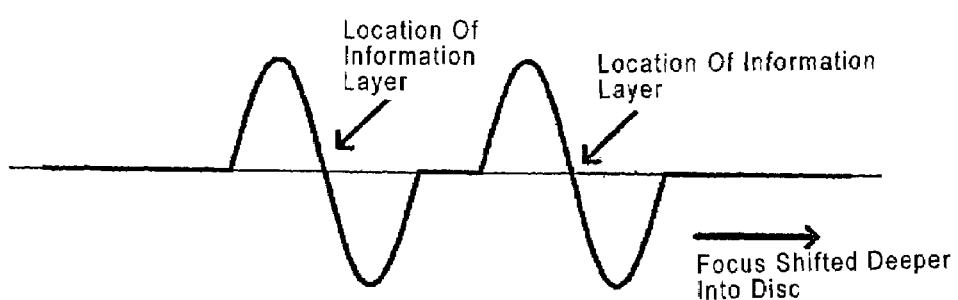

FIG. 17 shows the waveform of an FE signal obtained from a double-layer optical disc.

Figure 18:
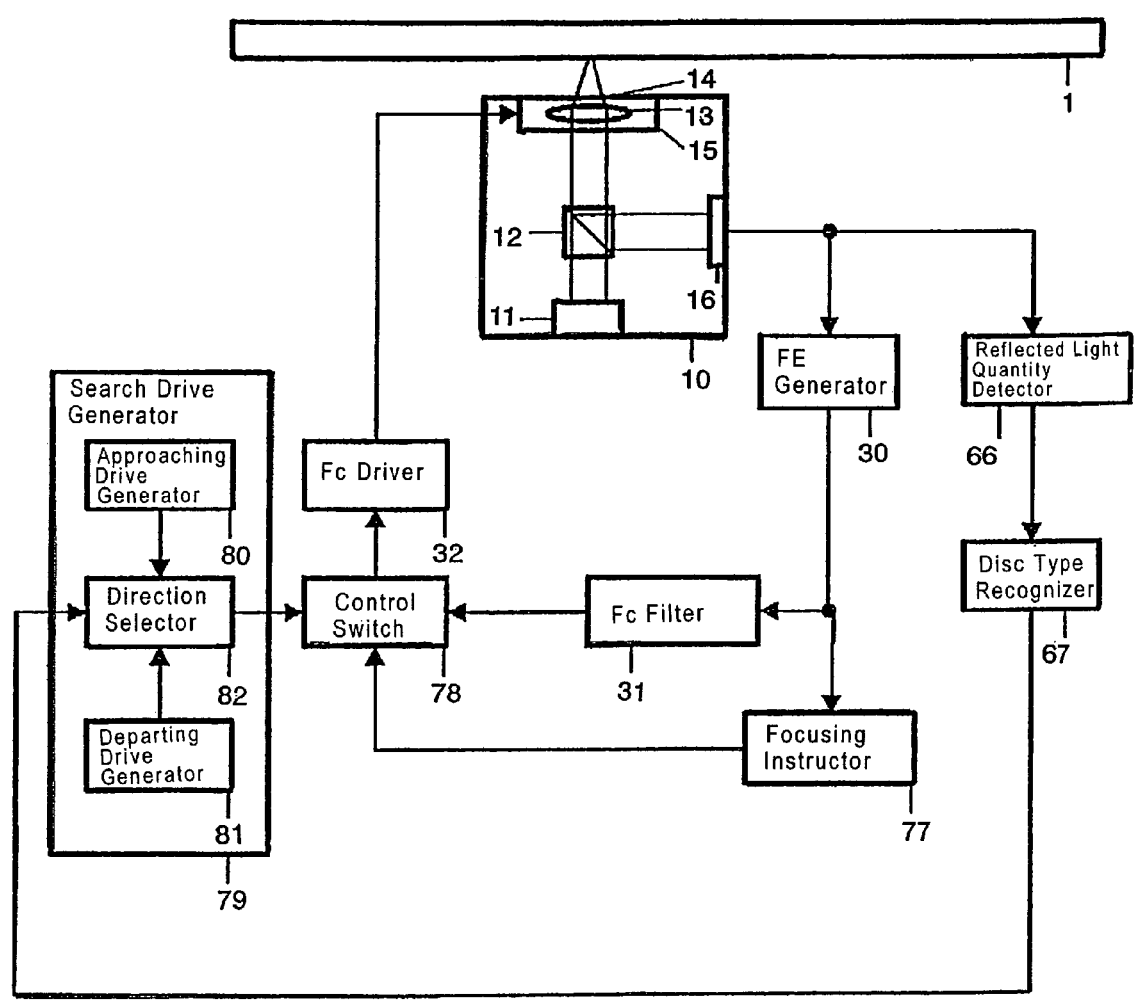

FIG. 18 is a block diagram showing an optical disc drive according to a fifth preferred embodiment of the present invention.

Figure 19:
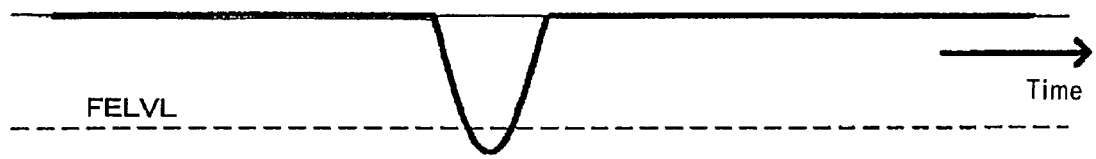
Figure 19:
Figure 19:

Portion (a) of FIG. 19 shows an output signal of an FE generator according to the fifth preferred embodiment, portion (b) of FIG. 19 shows an output signal of a focusing instructor according to the fifth preferred embodiment, and portion (c) of FIG. 19 shows the sources of drive signals to be selected by a control switch.

Figure 20:
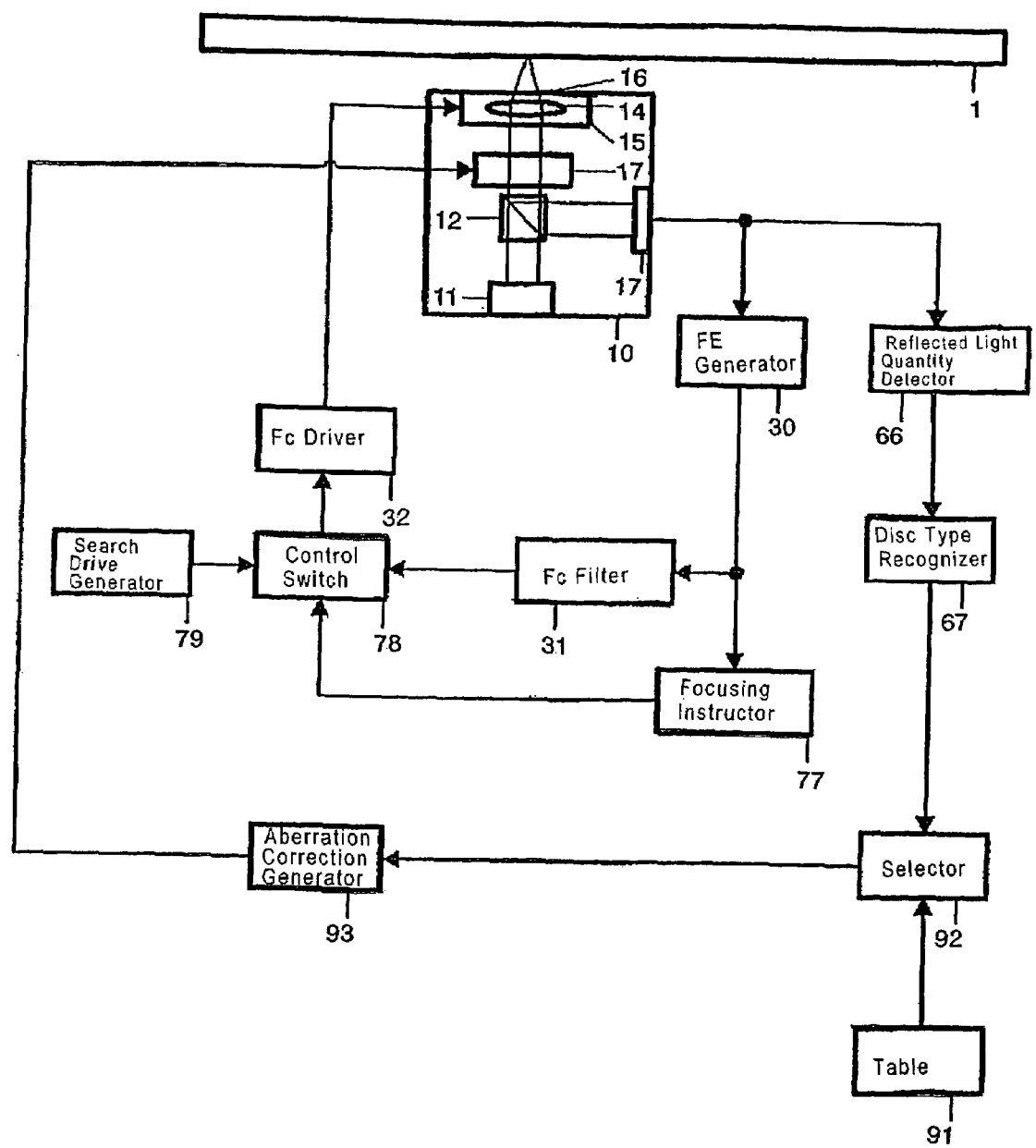

FIG. 20 is a block diagram showing an optical disc drive according to a sixth preferred embodiment of the present invention.

BEST MODE FOR CARRYING OUT THE INVENTION

Embodiment 1

Hereinafter, an optical disc drive according to a first preferred embodiment of the present invention will be described with reference to the accompanying drawings.

An optical disc drive according to this preferred embodiment can read and write data from/on at least two types of optical discs such as those shown in FIG. 6. One of the two types of optical discs shown in FIG. 6 has one information layer, while the other has two information layers. A laser beam for reading and writing data is radiated toward the substrate from under the disc shown in FIG. 6.

In the example illustrated in FIG. 6, the depth of the information layer of the single-layer optical disc, that of the lower information layer (which will be referred to herein as a "first information layer") of the double-layer optical disc, and that of the upper information layer (which will be referred to herein as a "second information layer") of the double-layer optical disc are all different from each other. Accordingly, if the depth of an information layer, on which the focal point of the light beam is located, can be detected, then it is possible to determine, by the detected depth of the information layer, whether the optical disc being irradiated with the light beam is a single-layer optical disc or a double-layer optical disc. Also, if the optical disc being irradiated with the light beam is already known as a double-layer optical disc, it is also possible to determine on which of the two information layers of the double-layer optical disc the focal point of the light beam is currently located.

In this preferred embodiment, the depth of each information layer is associated with the magnitude of correction to be made on the spherical aberration of a light beam (i.e., a variation to be caused in an optical system in order to minimize the spherical aberration), and the depth of any information layer is sensed by obtaining the magnitude of spherical aberration correction to make.

An optical system for minimizing the magnitude of spherical aberration changes its state with the depth of the information layer. On the other hand, the state of an optical system that has been regulated so as to minimize the spherical aberration can be evaluated by voltage, current and other parameters to drive the optical system. That is to say, the magnitude of spherical aberration correction to make can be estimated from these parameters. Accordingly, the values of these parameters (i.e., the magnitudes of spherical aberration corrections) can be associated with the depths of information layers.

According to the present invention, a mechanism for changing the spherical aberration is provided for an optical disc drive and driven in accordance with an electrical signal (i.e., a drive signal), thereby minimizing the spherical aberration. And the magnitude of spherical aberration correction to make is detected based on the value (e.g., the voltage level) of the drive signal when the spherical aberration is minimized. By comparing the detected value of the drive signal (i.e., the magnitude of spherical aberration correction) with a prestored value in the memory of the optical disc drive, the depth of the information layer can be sensed.

Figure 1:
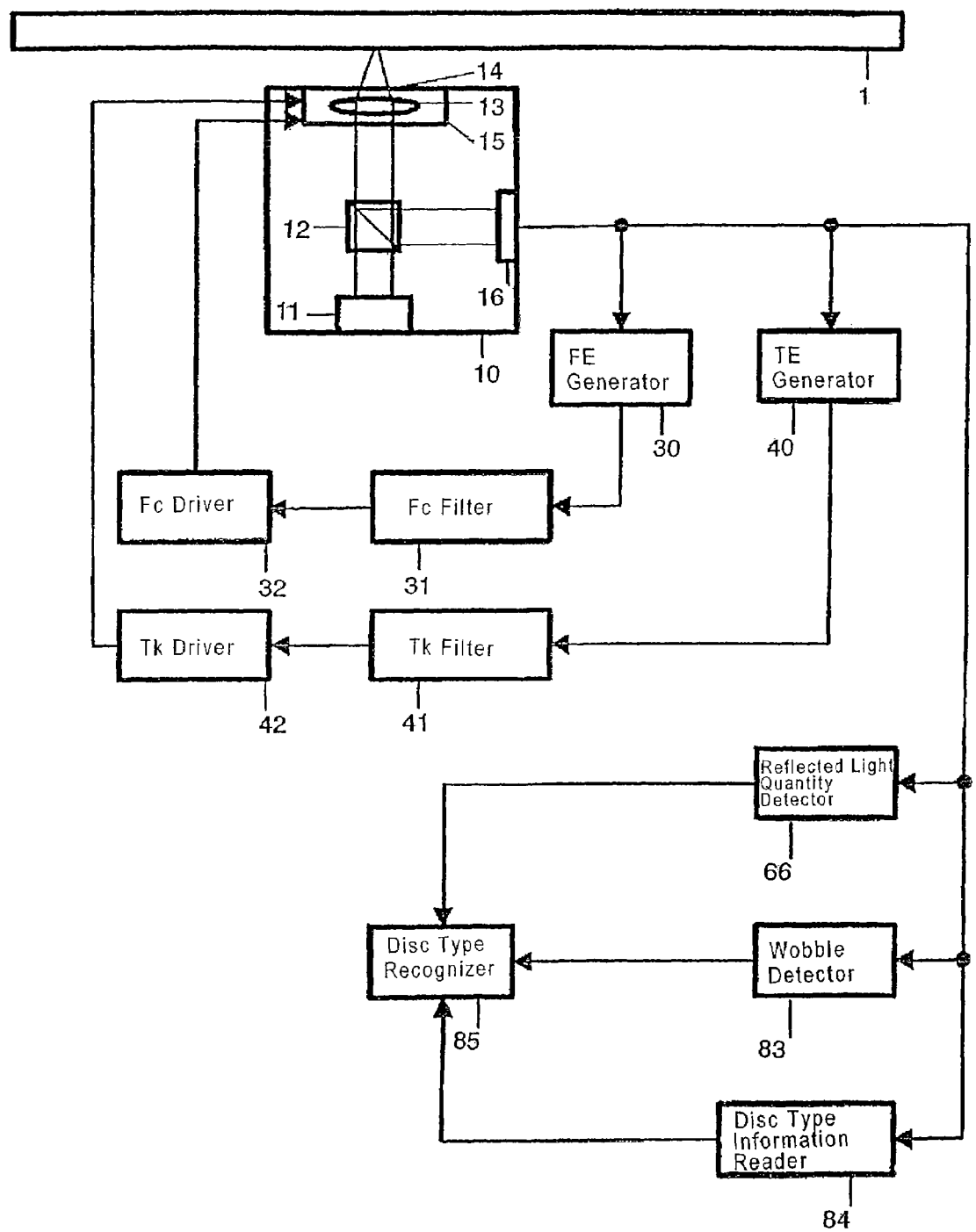
FIG. 1 is a block diagram showing a configuration for a conventional optical disc drive.

Hereinafter, a configuration for an optical disc drive according to this preferred embodiment will be described with reference to FIG. 7. In FIG. 7, any component, having the same function as the counterpart shown in FIG. 1, is identified by the same reference numeral as that used in FIG. 1.

As shown in FIG. 7, the optical disc drive of this preferred embodiment is an apparatus that can read and/or write data from/on a loaded optical disc 1 and includes a mechanism for rotating the optical disc 1 with a motor (not shown), an optical head 10 for irradiating the rotating optical disc 1 with laser light, and a section for driving the optical head 10 and processing and controlling the output signals of the optical head.

The optical head 10 includes a laser light source 11, a condenser lens 13, a polarization beam splitter 12, an Fc actuator 14, a Tk actuator 15, a photodetector 16 and a spherical aberration producer 17.

The spherical aberration producer 17 of the optical head 10 changes the spherical aberration at the focal point of a light beam. First, a configuration for the spherical aberration producer 17 will be described with reference to FIG. 8.

The spherical aberration producer 17 of this preferred embodiment includes a convex lens and a concave lens as a set. As shown in FIG. 8, by changing the distance between the convex and concave lenses, the light beam emitted from the laser light source turns from one of diverging light, parallel light and converged light into another. If the light beam entering the condenser lens 13 is diverging light, then the aberration between the focal point of the light that has been transmitted through the center portion of the condenser lens 13 and that of the light that has been transmitted through the peripheral portion of the condenser lens 13, i.e., the spherical aberration, is relatively large. On the other hand, if the light beam entering the condenser lens 13 is converged light, then the aberration with respect to the focal point of the light transmitted through the peripheral portion of the condenser lens 13, i.e., the spherical aberration, is relatively small.

In this manner, by changing the distance between the convex and concave lenses of the spherical aberration producer 17, the spherical aberration can be adjusted. The distance between the convex and concave lenses of the spherical aberration producer 17 is controllable by regulating the magnitude of voltage or current applied to the actuator or motor that drives the convex lens.

The spherical aberration producer 17 does not have to have the exemplary configuration shown in FIG. 8. For example, the spherical aberration may also be controlled by changing the state of the light beam that is going to enter the condenser lens 13 with a liquid crystal layer of which the refractive index changes with a voltage applied thereto.

In this preferred embodiment, the amplitude of the voltage (i.e., drive signal) applied to the spherical aberration producer 17 corresponds to the magnitude of resultant spherical aberration. That is to say, the magnitude of spherical aberration can be estimated by the amplitude of the voltage (drive signal) applied to the spherical aberration producer 17. As described above, in a situation where the light beam has been converged onto a particular information layer, if the amplitude of the voltage (or drive signal) applied to the spherical aberration producer 17 is regulated so as to minimize the spherical aberration, then the magnitude of that drive signal corresponds to the depth of the information layer.

Look at FIG. 7 again.

The optical disc drive of this preferred embodiment further includes an aberration error detector 60 for detecting the spherical aberration and a validity verifier 61 and an aberration regulator 62 for changing the spherical aberration according to the detected magnitude of the spherical aberration.

In accordance with the signal supplied from the photodetector 16, the aberration error detector 60 generates a signal representing the magnitude of spherical aberration at the focal point of the light beam (which will be referred to herein as a "spherical aberration signal"). This spherical aberration signal is send to the validity verifier 61 and aberration regulator 62.

The spherical aberration signal, generated by the aberration error detector 60 of this preferred embodiment, shows a sine waveform if the spherical aberration is equal to or smaller than a predetermined value but becomes approximately equal to zero if the spherical aberration increases and exceeds the predetermined value. If the spherical aberration signal supplied from the aberration error detector 60 has a non-zero absolute value, then the validity verifier 61 outputs a high-level signal, meaning "valid", to the aberration regulator 62. On the other hand, if the spherical aberration signal has an absolute value of approximately zero, then the validity verifier 61 outputs a low-level signal to the aberration regulator 62. That is to say, in performing the operation of reducing the spherical aberration, first, the spherical aberration producer 17 is driven such that the output signal of the validity verifier 61 changes from the low level into the high level. Once the output of the validity verifier 61 has gone high, the spherical aberration producer 17 is driven such that the sine wave portion of the spherical aberration signal becomes equal to zero. Hereinafter, this point will be described in further detail.

The aberration regulator 62 sequentially performs the following two-stage regulating operations, thereby outputting a drive signal to the spherical aberration producer 17 and disc type recognizer 63.

First, in the first stage of the regulating operation, the aberration regulator 62 drives the spherical aberration producer 17 such that the output signal of the validity verifier 61 goes high. For example, by gradually changing the voltage level of the drive signal for the spherical aberration producer 17 (which will be referred to herein as a "spherical aberration correction signal"), the aberration regulator 62 changes the spherical aberration within a wide range. Then, the aberration regulator 62 senses the value of the spherical aberration correction signal when the output signal of the validity detector 61 changes from the low level into the high level. In the second stage of the regulating operation, the aberration regulator 62 makes a fine adjustment on the voltage level of the spherical aberration correction signal to drive the spherical aberration producer 17, thereby correcting the aberration such that the output signal of the aberration error detector 60 crosses zero with respect to the reference level.

In accordance with the drive signal supplied from the aberration regulator 62, the disc type recognizer 63 detects the distance from the surface of the optical disc 1, on which the light beam is incident, to the information layer, on which the focal point of the light beam is located (i.e., the depth of the information layer), thereby recognizing the type of the optical disc based on the depth of the information layer.

Next, it will be described in detail with reference to FIG. 9 how to detect the spherical aberration in this preferred embodiment. In FIG. 9, the hatched portions represent cross sections of the light beam.

In this preferred embodiment, the light beam that has been reflected from the optical disc is split into an inside beam portion and an outside beam portion through a hologram, for example. Then, the inside portion of the light beam is allowed to be incident on a photodiode 16a, while the outside portion thereof on a photodiode 16b. In the example illustrated in FIG. 9, each of the photodiodes 16a and 16b includes four separate light detecting portions and generates an electrical signal representing the intensity of the light that these light detecting portions have received.

The aberration error detector 60 shown in FIG. 7 receives the respective outputs of the photodetector 16, including those of the photodiodes 16a and 16b, and generates an inside FE signal and an outside FE signal for the inside and outside portions of the light beam, respectively, by the same method as that used to generate the FE signal.

As shown in FIG. 5, the spherical aberration is an aberration produced between the focal point of a light beam passing the inside portion of the condenser lens 13 and that of a light beam passing the outside portion of the condenser lens 13. Accordingly, the magnitude of the spherical aberration produced can be detected by calculating the difference between the inside and outside FE signals. In this preferred embodiment, the difference between the inside and outside FE signals is used as a signal representing the magnitude of spherical aberration produced (i.e., the spherical aberration signal), and the spherical aberration producer 17 of the optical head 10 is driven under predetermined conditions so as to reduce the value of this spherical aberration signal. In other words, the spherical aberration signal is made to cross zero by controlling the level of the signal supplied to the spherical aberration producer 17 to drive it (i.e., the spherical aberration correction signal).

Next, it will be described in detail with reference to FIG. 10 how to correct the spherical aberration. FIG. 10 shows cross sections of two types of optical discs and the waveforms of spherical aberration signals in a situation where the focal point of the light beam is located right on the information layer of each optical disc.

As can be seen from FIG. 10, when the light beam is focused on the information layer, the magnitude of the spherical aberration correction signal at the zero-crossing point of the spherical aberration signal changes with the depth of the information layer. As shown on the left-hand side of FIG. 10, if the information layer is relatively shallow, the spherical aberration signal crosses zero when the spherical aberration correction signal has a comparatively small value. Conversely, if the information layer is relatively deep, the spherical aberration signal crosses zero when the spherical aberration correction signal has a comparatively large value as shown on the right-hand side of FIG. 10.

As also shown in FIG. 10, the spherical aberration signal is a signal to be generated based on the FE signal detection principle, and therefore, has as limited an error detection range as the FE signal. Accordingly, the spherical aberration signal becomes zero outside of the limited error detection range. More specifically, the aberration correction signal shown in FIG. 10 includes a portion with a substantially sine waveform (i.e., a valid portion) and portions with zero amplitude.

Next, it will be described in detail with reference to FIG. 11 how the validity verifier 61 operates.

As described above, the spherical aberration signal, generated by the aberration error detector 60, has its detection range. Portion (a) of FIG. 11 shows the output spherical aberration signal of the aberration error detector 60, while portion (b) of FIG. 11 shows the output signal of the validity verifier 61. In portions (a) and (b) of FIG. 11, the abscissa represents the magnitude of the spherical aberration correction signal to drive the spherical aberration producer 17.

If the spherical aberration signal, output from the aberration error detector 60, remains zero for a predetermined amount of time, the validity verifier 61 generates a low-level signal. Accordingly, as shown in portion (b) of FIG. 11, the output signal of the validity verifier 61 is high within the detection range of the spherical aberration signal.

In the first stage of its regulating operation, the aberration regulator 62 changes the level of the spherical aberration correction signal, thereby searching for a level of the spherical aberration correction signal at which the output of the validity verifier 61 goes high. When the output of the validity verifier 61 reaches the high level, the aberration regulator 62 enters the second stage of its regulating operation. Specifically, the aberration regulator 62 regulates the level of the spherical aberration correction signal such that the spherical aberration signal, supplied from the aberration error detector 60, crosses zero with respect to the reference level. More particularly, the aberration regulator 62 drives the spherical aberration producer 17 such that the spherical aberration signal crosses zero with respect to the reference level, and stores, in a memory, the level of the spherical aberration correction signal when the spherical aberration signal crosses zero with respect to the reference level.

In this manner, the spherical aberration is minimized in accordance with the distance from the information layer on which the focal point of the light beam is located to the surface of the substrate (i.e., the depth of the information layer), and the value of the spherical aberration correction signal that minimizes the spherical aberration is detected. This value changes with the depth of the information layer. Thus, the depth of a target information layer can be determined by the value of the spherical aberration correction signal that minimizes the spherical aberration.

The disc type recognizer 63 senses the depth of the information layer by the value of the spherical aberration correction signal that minimizes the spherical aberration. More specifically, the disc type recognizer 63 includes means for comparing the value of the spherical aberration correction signal that minimizes the spherical aberration with a predetermined value stored in a memory (not shown), and determines, based on the result of comparison, what information layer the value of the spherical aberration correction signal that minimizes the spherical aberration is associated with. As shown in FIG. 5, the information layer of the single-layer optical disc and the lower and upper information layers of the double-layer optical disc have mutually different depths. Accordingly, based on that value of the spherical aberration correction signal corresponding to the depth of the information layer, the disc type recognizer 63 can locate the information layer on which the light beam is converged and focused. The disc type recognizer 63 can also determine, according to that value of the spherical aberration correction signal corresponding to the depth of the information layer, whether the optical disc being irradiated with the light beam is a single-layer optical disc or a double-layer optical disc.

In the preferred embodiment described above, the aberration regulator 62 regulates the spherical aberration by using the spherical aberration signal supplied from the aberration error detector 60 and the output signal of the validity verifier 61. However, if the spherical aberration signal, supplied from the aberration error detector 60, has a sufficiently wide detection range, then the aberration regulator 62 may regulate the spherical aberration using only the spherical aberration signal supplied from the aberration error detector 60.

Conversely, if the spherical aberration signal has a sufficiently narrow detection range, then the aberration regulator 62 may regulate the spherical aberration using only the output signal of the validity verifier 61.

Optionally, the aberration regulator 62 may also regulate the amplitude of the spherical aberration correction signal supplied to the spherical aberration producer 17 in accordance with a TE signal, representing how much the focal point of the light beam deviates from the track, such that the amplitude of the TE signal is maximized. In that case, a value of the spherical aberration correction signal that maximizes the amplitude of the TE signal corresponds to the "depth of information layer".

In the preferred embodiment described above, single-layer and double-layer optical discs are recognized. However, an optical disc with three or more information layers may also be distinguished from other types of optical discs.

In any case, to recognize the type of a given optical disc by the depth of the information layer in a short time, the depth of an information layer closest to the surface (i.e., the lowermost layer) of one optical disc to be recognized is preferably different from that of the lowermost layer of another.

It should be noted that the voltage to drive the focus actuator also changes with the depth of the information layer. However, the focus actuator is driven such that the focal point of the light beam can still catch up with the information layer even if the focal point shifts within a broad range of 300 μm to 400 μm due to the flutter of the optical disc. For that reason, an information layer depth of about 100 μm cannot be estimated accurately according to the level of the signal to drive the focus actuator. On the other hand, the spherical aberration can be corrected at a resolution of 30 μm or less in the depth direction. Thus, according to this preferred embodiment, the depth of the information layer can be sensed with high precision.

Embodiment 2

Hereinafter, an optical disc drive according to a second preferred embodiment of the present invention will be described with reference to FIG. 12. In FIG. 12, any component having the same function as the counterpart shown in FIG. 7 or 1 is identified by the same reference numeral as that used in FIG. 7 or 1 and the description thereof will be omitted herein.

The optical disc drive of this preferred embodiment includes an FE generator 30 and a TE generator 40 just like the conventional optical disc drive shown in FIG. 1 and also includes an aberration error detector 60, a validity verifier 61 and an aberration regulator 62 just like the preferred embodiment shown in FIG. 7. Unlike the optical disc drive shown in FIG. 7, the optical disc drive of this preferred embodiment further includes an address detector 64 and a disc type recognizer 65.

In the optical disc drive of this preferred embodiment, the output signal of the photodetector 16 is transmitted to not only the FE generator 30, TE generator 40 and aberration error detector 60 but also to the address detector 64. The address detector 64 detects the address on the optical disc 1, at which the focal point of the light beam is located, and then notifies the disc type recognizer 65 of the detection result.

On the other hand, the aberration regulator 62 operates just as already described for the first preferred embodiment and outputs a value of the aberration correction signal that minimizes the spherical aberration to the disc type recognizer 65.

If the address information provided by the address detector 64 is greater than a predetermined value or if the level of the signal supplied from the aberration regulator 62 (i.e., the value of the aberration correction signal that minimizes the spherical aberration) is out of a prescribed range, the disc type recognizer 65 of this preferred embodiment recognizes the optical disc 1 loaded in the optical disc drive as a double-layer optical disc.

On the other hand, if the address information provided by the address detector 64 is smaller than the predetermined value or if the level of the signal supplied from the aberration regulator 62 (i.e., the value of the aberration correction signal that minimizes the spherical aberration) is within the prescribed range, then the disc type recognizer 65 recognizes the optical disc 1 loaded in the optical disc drive as a single-layer optical disc.

The optical disc drive of this preferred embodiment can recognize the two types of optical discs such as those shown in FIG. 13 while being started up. FIG. 13 schematically illustrates cross sections of a single-layer optical disc and a double-layer optical disc. As shown in FIG. 13, each optical disc is irradiated with a light beam that has come from under the optical disc.

In the optical discs shown in FIG. 13, the information layer of the single-layer optical disc and the upper information layer of the double-layer optical disc have the same depth. Also, in the double-layer optical disc, addresses, representing locations on the tracks, are sequentially allocated to the shallower information layer closer to the surface of the optical disc and then to the deeper layer. Accordingly, the minimum address value is present on the shallower information layer that is closer to the surface of the optical disc on which the light beam is incident, while the maximum address value is present on the deeper information layer that is more distant from the surface of the optical disc on which the light beam is incident. Consequently, it is possible to determine, by the address value detected, on which information layer of the double-layer optical disc the focal point of the light beam is currently located.

As in the first preferred embodiment described above, the aberration regulator 62 of this preferred embodiment also drives the spherical aberration producer 17 so as to minimize the spherical aberration at the focal point of the light beam. As also described above, the value of the spherical aberration correction signal that minimizes the spherical aberration has a level corresponding to the depth of the information layer of the optical disc 1 on which the focal point of the light beam is currently located.

In the optical disc drive of this preferred embodiment, when the tracking control gets ON after the optical disc drive has been started up, the address detector 64 reads out an address that was recorded on a track of the optical disc 1.

If the information layer on which the focal point of the light beam is located is the first information layer as counted from the light incident surface of the double-layer optical disc, then the depth of that information layer is different from that of the information layer of the single-layer optical disc. Thus, the type of that optical disc and the level of the information layer of the optical disc can be detected.

On the other hand, if the information layer on which the focal point of the light beam is located is the second information layer as counted from the light incident surface of the double-layer optical disc and if the depth of that information layer is the same as that of the information layer of the single-layer optical disc, then the type of the given optical disc cannot be recognized directly by the drive value supplied from the aberration regulator 62. However, the address value allocated to that information layer of the double-layer optical disc is different from that allocated to the information layer of the single-layer optical disc. Thus, the type of the given optical disc can also be recognized by the address value provided by the address detector 64.

According to this preferred embodiment, the optical disc 1 being irradiated with the light beam is recognized as either the single-layer optical disc or the double-layer optical disc in this manner.

As in the first preferred embodiment described above, the aberration regulator 62 of this preferred embodiment also regulates the spherical aberration by using the spherical aberration signal supplied from the aberration error detector 60 and the output signal of the validity verifier 61. However, if the spherical aberration signal has a sufficiently wide detection range, then the aberration regulator 62 may regulate the spherical aberration using only the spherical aberration signal. Conversely, if the spherical aberration signal has a sufficiently narrow detection range, then the aberration regulator 62 may regulate the spherical aberration using only the output signal of the validity verifier 61. Furthermore, the aberration regulator 62 may also regulate the amplitude of the spherical aberration correction signal such that the amplitude of a TE signal, representing how much the focal point of the light beam deviates from the track, is maximized. Then, the depth of the information layer may be sensed according to the value of the spherical aberration correction signal that maximizes the amplitude of the TE signal.

Embodiment 3

Figure 2:
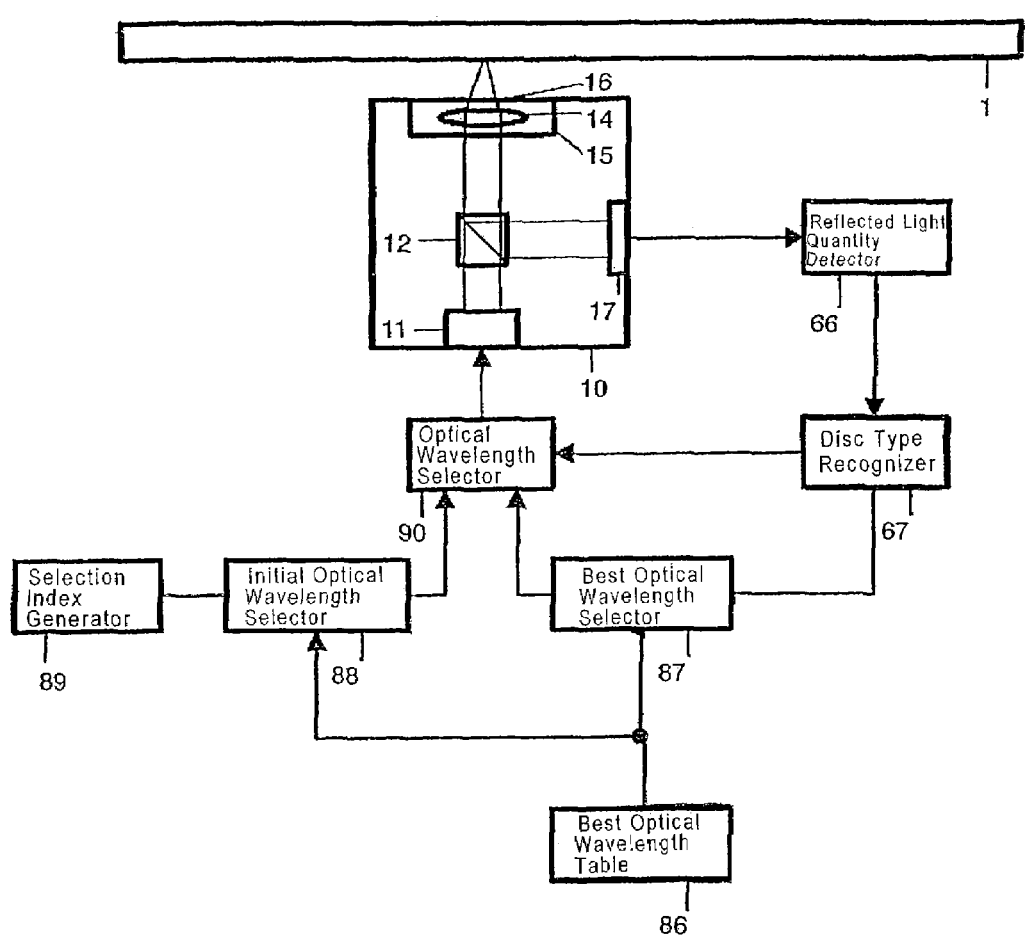
FIG. 2 is a block diagram showing a configuration for another conventional optical disc drive.

Hereinafter, an optical disc drive according to a third preferred embodiment of the present invention will be described with reference to FIG. 14. In FIG. 14, any component having the same function as the counterpart shown in FIG. 2 is identified by the same reference numeral as that used in FIG. 2 and the description thereof will be omitted herein.

The optical disc drive of this preferred embodiment includes a best light intensity table 68, an allowable light intensity table 70, a best light intensity selector 69, an initial light intensity selector 71, a selection index generator 72, and a light intensity selector 73.

The disc type recognizer 67 of this preferred embodiment recognizes the type of a given optical disc in accordance with a signal supplied from a reflected light quantity detector 66 and outputs a signal, representing the result of recognition, to the best light intensity selector 69. The disc type recognizer 67 may have a configuration for recognizing the type of a given optical disc according to the same principle as that already described for the first and second preferred embodiments. The disc type recognizer 67 sends a low-level signal to the light intensity selector 73 while still recognizing the type of the optical disc, but sends a high-level signal to the light intensity selector 73 after having recognized the type of the optical disc.

The best light intensity table 68 stores information about the best light intensities for multiple types of optical discs, from/on which this optical disc drive can read and/or write data.

The best light intensity selector 69 selects one of the best light intensities from the best light intensity table 68 in accordance with the recognition result of the disc type recognizer 67 and then outputs a signal, representing the light intensity selected, tot the light intensity selector 73.

The allowable light intensity table 70 stores information about highest possible light intensities, at or under which the information stored on the multiple types of optical discs to be processed by the optical disc drive of this preferred embodiment is never lost.

The selection index generator 72 supplies an index signal to the initial light intensity selector 71 so as to instruct the initial light intensity selector 71 to select the weakest light intensity. In accordance with the index signal supplied from the selection index generator 72, the initial light intensity selector 71 selects the weakest light intensity from the allowable light intensity table 70 and supplies a signal, representing the light intensity selected, to the light intensity selector 73.

If the signal supplied from the disc type recognizer 67 is low, the light intensity selector 73 selects the light intensity, provided by the initial light intensity selector 71, for the laser light source 11. On the other hand, if the signal supplied from the disc type recognizer 67 is high, the light intensity selector 73 selects the light intensity, provided by the best light intensity selector 69, for the laser light source 11. In response, the laser light source 11 radiates a light beam having the specified intensity toward the optical disc 1.

In this preferred embodiment, the following three types of optical discs can be processed, for example. A first optical disc may have a read light intensity of 0.3 mW and an allowable light intensity (at or under which the information stored on the information layer does not alter) of 0.5 mW. A second optical disc may have a read light intensity of 0.6 mW and an allowable light intensity (at or under which the information stored on the information layer does not alter) of 1.0 mW. A third optical disc may have a read light intensity of 0.9 mW and an allowable light intensity (at or under which the information stored on the information layer does not alter) of 1.5 mW.

In this case, the three values of 0.3 mW, 0.6 mW and 0.9 mW are stored on the best light intensity table 68, while the three values of 0.5 mW, 1.0 mW and 1.5 mW are stored on the allowable light intensity table 70. While the disc type recognizer 67 has not recognized the type of the given optical disc yet, the value of 0.5 mW is selected by the initial light intensity selector 71 and specified by the light intensity selector 73 for the laser light source 11. Once the disc type recognizer 67 has recognized the type of the optical disc, a value associated with the disc type recognized is selected by the best light intensity selector and then specified by the light intensity selector 73 for the laser light source 11.

According to this preferred embodiment, the start up process can be performed without altering any information on the information layer before the type of the given optical disc is recognized, no matter what type of disc has been loaded.

In the preferred embodiment described above, the weakest light intensity is supposed to be selected from the allowable light intensity table as the light intensity before the type of the given optical disc has been recognized. Alternatively, the weakest value may be selected from the best light intensity table. As another alternative, the best light intensity of a type of optical disc with the smallest number of information layers may be selected from the best light intensity table.

Embodiment 4

Hereinafter, an optical disc drive according to a fourth preferred embodiment of the present invention will be described with reference to FIG. 15. In FIG. 15, any component having the same function as the counterpart shown in FIG. 14 is identified by the same reference numeral as that used in FIG. 14 and the description thereof will be omitted herein.

The transport motor 76 shown in FIG. 15 is driven by a transport target generator 74 and a transport drive generator 75 functioning as transport driving means.

A signal representing the result of disc type recognition is transmitted from a disc type recognizer 67 to the transport target generator 74. In accordance with the recognition result, the transport target generator 74 supplies a signal, representing a target position to which the optical head 10 should be transported, to the transport drive generator 75.

The transport drive generator 75 generates a signal, which drives the transport motor 76 such that the transport motor 76 transports the optical head 10 to exactly the same position as the transport target position, and supplies that signal to the transport motor 76. In response to the drive signal supplied from the transport drive generator 75, the transport motor 76 transports the optical head 10 in the tracking direction.

FIG. 16 illustrates an optical disc to be read from and written to by the optical disc drive of this preferred embodiment. The optical disc shown in FIG. 16 has two zones, of which the boundary is defined so as to intersect with the radial direction. The outer zone is an area, which data can not only be written on by changing the intensity of the light beam but also be read from by sensing the quantity of the light beam reflected. On the other hand, the inner zone is an area, on which management information such as the number of information layers is stored as track wobbles and from which only the management information can be read. In multiple types of optical discs, the boundary between the rewritable zone and the read-only zone is defined at the same radial location.

The optical disc drive of this preferred embodiment could also process an optical disc on which the boundary is defined at a different radial location. However, the quantity of light reflected from such an optical disc is significantly different from that of light reflected from the optical disc described above. Accordingly, the disc type recognizer 67 can determine, according to the signal supplied from the reflected light quantity detector 66, whether or not the given optical disc is the type shown in FIG. 16.

When the disc type recognizer 67 recognizes the optical disc 1 loaded in the optical disc drive as the type shown in FIG. 16, the transport target generator 74 transmits a signal, setting the central radial location of the inner zone of the optical disc shown in FIG. 16 as the target location, to the transport drive generator 75. While checking the position of the transport motor 76, the transport drive generator 75 drives the transport motor 76 such that the focal point of the light beam is shifted to the central radial location of the inner zone. Thereafter, focus control and tracking control are started, and the number of information layers of the given optical disc 1 is sensed based on the information represented by the wobbles (i.e., management information). Then, the best light beam intensity is selected according to the number of information layers, thereby starting the optical disc drive up.

Since the inner zone of the optical disc shown in FIG. 16 is a read-only area, the information stored there as wobbles is never alterable irrespective of the intensity of the light beam. Accordingly, no matter what type of optical disc has been given, the start up process can be carried out without altering the information stored on the information layer of the given optical disc before recognizing its type.

As described above, according to this preferred embodiment, the number of information layers of the optical disc 1 is sensed based on the management information stored as track wobbles on the optical disc.

It should be noted that if an FE signal is obtained by shifting the focal point of the light beam in the focus direction without rotating the optical disc 1 at all and if the given optical disc is a double-layer optical disc, for example, then a signal having the waveform shown in FIG. 17 can be obtained. By counting the number of such curves appearing near the information layers (which will be referred to herein as "S-curves"), the number of information layers of the optical disc 1 can also be obtained. In that case, the S-curve also appears on the outermost surface of the optical disc. Thus, the number of information layers is actually obtained by subtracting one from the number of S-curves counted. If only the S-curve on the surface of the optical disc appeared during such counting, the accuracy of measurement could be increased by counting the number again.

Embodiment 5

Figure 3:
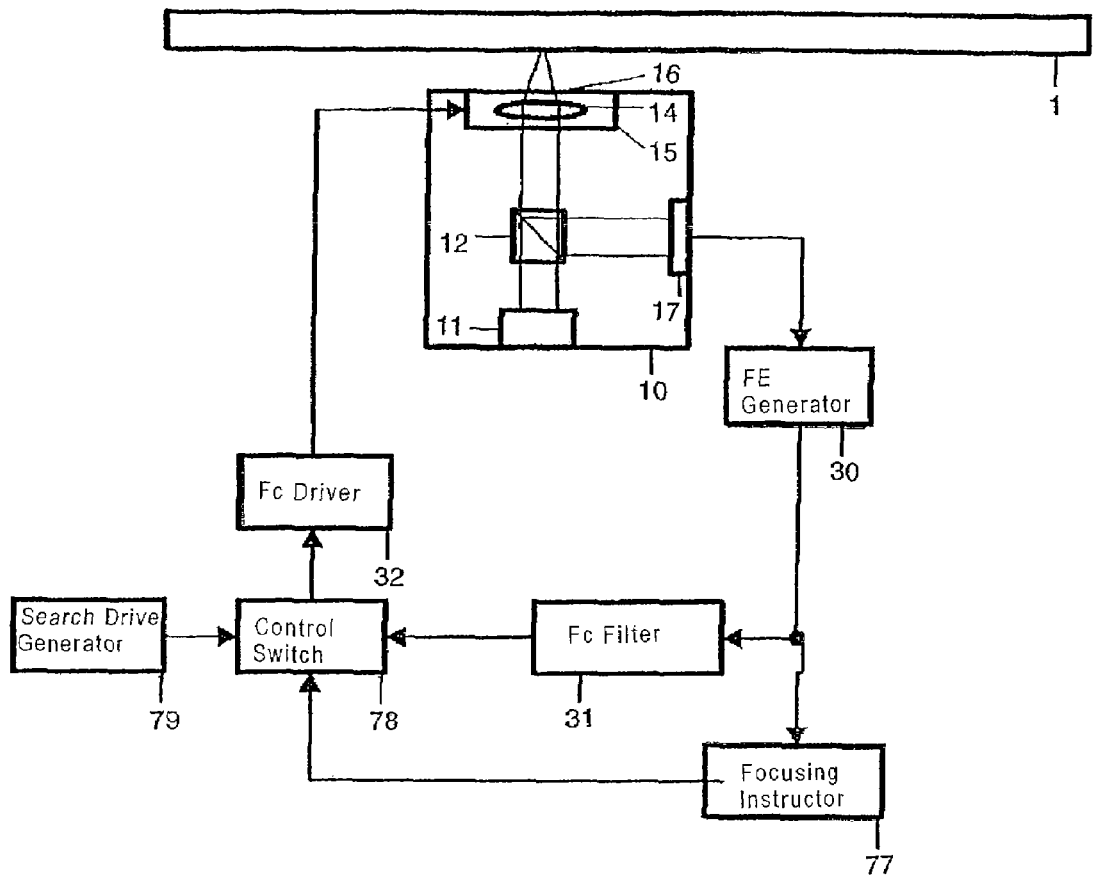
FIG. 3 is a block diagram showing a configuration for still another conventional optical disc drive.

Hereinafter, an optical disc drive according to a fifth preferred embodiment of the present invention will be described with reference to FIG. 18. In FIG. 18, any component having the same function as the counterpart shown in FIG. 3 is identified by the same reference numeral as that used in FIG. 3 and the description thereof will be omitted herein.

The optical disc drive of this preferred embodiment includes an approaching drive generator 80, a departing drive generator 81 and a direction selector 82, which together functions as search driving means.

In the optical disc drive of this preferred embodiment, the output signal of the photodetector 16 is supplied not only to the FE generator 30 but also to the reflected light quantity detector 66. In response to the signal supplied from the photodetector 16, the reflected light quantity detector 66 transmits a signal, representing the quantity of light reflected from the optical disc 1, to the disc type recognizer 67. In accordance with the signal supplied from the reflected light quantity detector 66, the disc type recognizer 67 determines whether or not the optical disc loaded in the optical disc drive has the configuration shown in FIG. 13. If the answer is YES, then the disc type recognizer 67 sends a high-level signal to the direction selector 82. Otherwise, the disc type recognizer 67 sends a low-level signal to the direction selector 82. Alternatively, the disc type recognizer 67 may also have a configuration for recognizing the type of the optical disc on the same principle as that already described for the first and second preferred embodiments.

The approaching drive generator 80 transmits a drive signal, instructing that the condenser lens 13, located away from the optical disc 1, be brought toward the optical disc 1, to the direction selector 82. On the other hand, the departing drive generator 81 transmits a drive signal, instructing that the condenser lens 13 be brought away from the optical disc 1, to the direction selector 82.

If the high-level signal is supplied from the disc type recognizer 67, then the direction selector 82 passes the output signal of the departing drive generator 81 to a control switch 78. On the other hand, if the low-level signal is supplied from the disc type recognizer 67, then the direction selector 82 passes the output signal of the approaching drive generator 80 to the control switch 78.

FIG. 13 illustrates cross sections of two types of optical discs to be processed by the optical disc drive of this preferred embodiment. As shown in FIG. 13, each optical disc is irradiated with a light beam that has come from under the optical disc.

As shown in FIG. 13, the information layer of the single-layer optical disc and the second information layer of the double-layer optical disc have the same depth. The optical disc drive of this preferred embodiment could also process other types of optical discs with different information layer depths from those of the two types of optical discs shown in FIG. 13. However, the quantity of light reflected from any of those optical discs is significantly different from that of light reflected from the optical disc described above. Accordingly, the disc type recognizer 67 can determine, according to the signal supplied from the reflected light quantity detector 66, whether or not the given optical disc is the type shown in FIG. 13.

Next, it will be described with reference to portions (a) through (c) of FIG. 19 how the optical disc drive of this preferred embodiment performs a focusing operation. Portion (a) of FIG. 19 shows the output FE signal of the FE generator 30 shown in FIG. 18, portion (b) of FIG. 19 shows the output signal of a focusing instructor 77, and portion (c) of FIG. 19 shows the sources of drive signals to be selected by the control switch 78.

In portions (a) through (c) of FIG. 19, the abscissa represents the time. On recognizing the given optical disc 1 as one of the two types of optical discs shown in FIG. 13, the disc type recognizer 67 of this preferred embodiment sends a high-level signal to the direction selector 82. In response, the direction selector 82 passes the output signal of the departing drive generator 81 to the control switch 78. In the initial stage of the startup operation, the control switch 78 selects the drive signal supplied from the direction selector 82, thereby shifting the focal point of the light beam, which has been converged by the condenser lens 13, away from the optical disc 1.

When the FE signal supplied from the FE generator 30 crosses zero after having decreased from its reference level FELVL, the output signal of the focusing instructor 77 changes from the low level into the high level. As of that moment, the control switch 78 selects the output signal of the Fc filter 31, thus turning the focus control ON. In this case, the focus control is carried out on the information layer, which is most distant from the surface of the optical disc. Specifically, in the single-layer optical disc, the only information layer is subjected to the focus control. On the other hand, in the double-layer optical disc, the information layer that is the second deepest as counted from the light incident plane of the optical disc is subjected to the focus control. These two information layers have the same depth as shown in FIG. 13 and there is no need to adjust the spherical aberration.

In the apparatus of recognizing the type of the given optical disc 1 based on the optical disc information stored on the optical disc 1, the time it takes to complete the recognition does not increase by the time it takes to adjust the spherical aberration, and therefore, the startup time does not increase, either.

In the preferred embodiment described above, the deepest information layer, which is most distant from the surface, is as deep as the information layer of the single-layer optical disc. Thus, the focusing operation is carried out with the focal point of the light beam shifted away from a close position. However, if the shallowest information layer, which is closest to the surface, is as deep as the information layer of the single-layer optical disc, then the focusing operation may be carried out with the focal point of the light beam shifted from a distant position toward the optical disc.

Embodiment 6

Hereinafter, an optical disc drive according to a sixth preferred embodiment of the present invention will be described with reference to FIG. 20. In FIG. 20, any component having the same function as the counterpart shown in FIG. 18 or 3 is identified by the same reference numeral as that used in FIG. 18 or 3 and the description thereof will be omitted herein.

The optical disc drive of this preferred embodiment includes a table 91 on which information about the depths of information layers is stored, a selector 92 and an aberration correction generator 93.

The table 91 stores the depths of all information layers of multiple types of optical discs to be read from and written to by this optical disc drive.

The selector 92 receives a signal representing the recognition result from the disc type recognizer 67. Also, the selector 92 retrieves the information layer depths of all optical discs that can be loaded into this optical disc drive from the table 91 and calculates the average thereof. This average is passed to the aberration correction generator 93. In accordance with the signal supplied from the selector 92, the aberration correction generator 93 generates a spherical aberration correction signal, thereby driving the spherical aberration producer 17.

In response to the spherical aberration correction signal supplied from the aberration correction generator 93, the spherical aberration producer 17 changes the spherical aberration at the focal point of the light beam. After the spherical aberration has been corrected, the focusing operation is performed as already described for the prior art.

Suppose the single-layer optical disc shown in FIG. 6 has an information layer depth of 109 μm and the double-layer optical disc has information layer depths of 80 μm and 120 μm, respectively. If the disc type recognizer 67 recognizes the optical disc, loaded in the optical disc drive, as either the single-layer optical disc or the double-layer optical disc shown in FIG. 6, then the selector 92 sends a signal, representing the average depth of 109 μm of these three information layers, to the aberration correction generator 93. According to this preferred embodiment, the average of possible information layer depths is known before the focusing operation is started. Thus, the deterioration of the FE signal can be minimized. Consequently, the focusing operation can be stabilized.

In the preferred embodiment described above, the average of all possible information layer depths is calculated and used. Alternatively, only the maximum and minimum values can be extracted from those possible information layer depths and then their average may be calculated and used.

In the preferred embodiments described above, the single-layer and double-layer optical discs are supposed to be loaded. However, the optical disc drive of this preferred embodiment may also be loaded with an optical disc with three or more information layers.

INDUSTRIAL APPLICABILITY

An optical disc drive according to the present invention detects the depth of an information layer of the given optical disc, on which the light beam is currently converged, in accordance with the state of an optical system that is needed to minimize the spherical aberration. Then, based on the detected depth of the information layer, the optical disc drive can recognize the type of the optical disc that has been loaded thereto. According to the present invention, an optical disc drive to be loaded with a rewritable multilayer optical disc can be started up quickly.

A next-generation optical disc, having higher storage capacity than a DVD, uses a light beam having a shorter wavelength and a condenser lens having a higher NA as compared with a DVD. For that reason, the optical disc drive thereof needs to be provided with a mechanism for correcting the spherical aberration. According to the present invention, the distance between the information layer and the surface of the disc is sensed, and the type of the given optical disc is recognized, by using such a mechanism. Thus, the type of the given optical disc can be recognized quickly without increasing the cost significantly.

The invention claimed is:

1. An optical disc drive for reading and/or writing data from/on an optical disc, having at least one information layer, by using a light beam, the optical disc drive comprising:
a spherical aberration detecting section for generating a spherical aberration signal representing a spherical aberration that has been produced at a focal point of the light beam on the information layer of the optical disc;
a spherical aberration changing section for changing the spherical aberration;
a spherical aberration regulating section for generating an aberration correction signal to correct the spherical aberration by driving the spherical aberration changing section;
a memory for storing information on relationship between predetermined values of the aberration correction signal and distances from information layers of different types of optical discs to the surface of the optical discs; and
means for detecting a value of the aberration correction signal that minimizes the spherical aberration in a situation where the focal point of the light beam is located on the information layer of the optical disc and for detecting the depth of the information layer, which corresponds to a distance from the information layer on which the focal point of the light beam is located to the surface of the optical disc, by comparing the value detected with the predetermined values of the aberration correction signal stored on the memory.

2. The optical disc drive of claim 1, further comprising comparing means for comparing the value of the aberration correction signal, which minimizes the spherical aberration in the situation where the focal point of the light beam is located on the information layer of the optical disc, with a predetermined value.

3. The optical disc drive of claim 2, wherein if the optical disc, irradiated with the light beam, has a plurality of information layers, the optical disc drive determines, based on a comparison result obtained by the comparing means, on which of the information layers the focal point of the light beam is currently located.

4. The optical disc drive of claim 2, wherein the optical disc drive recognizes, based on a comparison result obtained by the comparing means, the type of the optical disc being irradiated with the light beam.

5. The optical disc drive of claim 2, wherein the optical disc drive detects, based on a comparison result obtained by the comparing means, the number of the information layers that the optical disc being irradiated with the light beam has.

6. The optical disc drive of claim 2, wherein if the optical disc, irradiated with the light beam, has a plurality of information layers, the optical disc drive determines, based on a comparison result obtained by the comparing means and address information acquired from the information layer on which the focal point of the light beam is located, on which of the information layers the focal point of the light beam is currently located.

7. The optical disc drive of claim 1, wherein the optical disc drive detects a quantity, corresponding to a distance from the surface of the optical disc to one of the information layers that is closest to the surface of the optical disc, thereby recognizing the optical disc being irradiated with the light beam based on the quantity detected.

8. The optical disc drive of claim 1, further comprising:
converged beam irradiating means for converging the light beam and irradiating the optical disc with the converged light beam;
a focus regulating section for shifting the focal point of the light beam, which has been converged by the converged beam irradiating means, perpendicularly to the information layers of the optical disc;
a focus error signal detecting section for generating a signal representing the deviation of the focal point of the light beam from each said information layer of the optical disc; and
a focus control driving section for driving the focus regulating section in response to a signal supplied from the focus error signal detecting section such that the focal point of the light beam catches up with the information layer of the optical disc.

9. The optical disc drive of claim 1, further comprising:
a tracking error detecting section for detecting a signal representing a positional relationship between the focal point of the light beam and a track on the optical disc; and
an amplitude detecting section for detecting the amplitude of a signal supplied from the tracking error detecting section,
wherein the spherical aberration regulating section drives the spherical aberration changing section so as to maximize a signal supplied from the amplitude detecting section.

10. The optical disc drive of claim 1, wherein the spherical aberration regulating section drives the spherical aberration changing section so as to make the signal supplied from the spherical aberration detecting section equal to zero.

11. The optical disc drive of claim 10, further comprising a judging section for judging the validity of the spherical aberration signal supplied from the spherical aberration detecting section,
wherein the spherical aberration regulating section drives the spherical aberration changing section such that the judging section recognizes the validity of the spherical aberration signal and then drives the spherical aberration changing section such that the spherical aberration signal supplied from the spherical aberration detecting section becomes zero.

12. The optical disc drive of claim 1, further comprising judging means for judging the validity of the spherical aberration signal supplied from the spherical aberration detecting section,
wherein the spherical aberration regulating section drives the spherical aberration changing section such that the judging means recognizes the validity of the spherical aberration signal.

* * * * *